United States Patent [19]

Fine et al.

[11] Patent Number: 5,241,657
[45] Date of Patent: Aug. 31, 1993

[54] INFORMATION DISPLAY SYSTEM

[76] Inventors: Brandt J. Fine, 2829 Sonoma, Torrence, Calif. 90503; Byron Anderson, 1120 S. Wright, Liberty Lake, Wash. 99019

[21] Appl. No.: 474,601

[22] Filed: Feb. 5, 1990

[51] Int. Cl.⁵ .......................................... G06F 15/62
[52] U.S. Cl. ................................... 395/162; 395/153
[58] Field of Search ............................. 364/518–521; 395/154, 154, 155–161, 162–166

[56]  References Cited

U.S. PATENT DOCUMENTS

| | | | |
|---|---|---|---|
| 4,805,119 | 2/1989 | Maeda et al. | 364/518 |
| 4,873,643 | 10/1989 | Powell et al. | 364/521 X |
| 4,962,466 | 10/1990 | Revesz et al. | 364/518 |
| 5,046,027 | 9/1991 | Taafee et al. | 395/164 X |

*Primary Examiner*—Gary V. Harkcom
*Assistant Examiner*—Almis Jankus
*Attorney, Agent, or Firm*—Mark W. Hendricksen

[57]   ABSTRACT

An information display system and method for displaying information on multiple information display means. The information display system is generally comprised of a system controller, one or more direct controller, multiple information display units and one or more display lines, which facilitate the transmission of operating power and information to the information display units. The system controller combines each unit of source information with its own address code, thereby forming an addressed information unit. The system controller transmits the addressed information unit to a direct controller designated by said information unit's address code. The direct controller utilizes the address code to then store the information unit relative to other information units such that when it is later serially transmitted with the other information units to be displayed on the same display line, each information unit ends up at the information display unit designated by its address code and is converted to a visual display.

24 Claims, 22 Drawing Sheets

Microfiche Appendix Included
(2 Microfiche, 62 Pages)

INFORMATION DISPLAY SYSTEM

REFERENCE TO MICROFICHE INDEX

Pursuant to 37 C.F.R. 1.96, this specification includes a microfiche appendix which is filed herewith, comprising two microfiche cards, labeled as "Appendix #1 Information Display System ½" and "Appendix #2 Information Display System 2/2". The microfiche labeled as Appendix #1 contains thirty frames and the microfiche labeled as Appendix #2 contains forty-one frames.

FIELD OF THE INVENTION

This invention generally relates to an information display system and method for concurrently displaying information on multiple information display means.

BACKGROUND OF THE INVENTION

For many years businesses have been attempting to reduce their operating costs and their labor costs by automating and thereby eliminating repetitious manual tasks. The business function of displaying information is no exception. There is a high potential cost savings in labor and material associated with eliminating the need to have personnel go to each display location and manually change the displays.

In situations where there are multiple information display means coupled with a frequent need to change the information being displayed, there is a potential to save a tremendous amount of money if the automation means is relatively inexpensive, low maintenance and greatly reduces the labor and material costs.

Those existing automated information display systems which have some capacity to display and control information on multiple information display units are not sufficiently reliable and do not have sufficient versatility for different applications. Further, the existing information display systems do not adequately reduce the labor and material costs associated with changing the displayed information or verifying the accuracy thereof.

Most automated information display systems currently used in retail stores for displaying price and related information for example, are only capable of displaying information in one format on multiple identical displays.

Further, information display systems currently utilized do not have a sufficient error detection means to verify the proper information is being displayed at the proper location. The identification and correction of errors in those systems generally must be accomplished by visual observation of the display units.

Because of the problems experienced to date with retail store information display systems, most retail stores, for example, continue to utilize single-use displays, which require store personnel walk the aisles and manually change the plastic or paper displays to reflect sales, price changes, product relocations and the like.

In these retail stores, each item of goods contains a Uniform Product Code ("UPC") bar code. The computer-based cash register utilizes an infrared or other type of scanner to read the Uniform Product Code on the product and convert the bar code for that product to a price.

The stores utilizing the forenamed displays will save the labor costs of individually marking the price on each item, but will experience additional material costs related to the price labels and will still experience the high labor costs associated with manually changing the price labels on the shelves every time a change is required. The stores will also continue to incur the unnecessary expenses related to having erroneous prices on the displays and the labor expense related to visually observing the displays to verify the correct prices are on the shelves adjacent to the correct goods.

In developing an information or price display system with electronic information display means which eliminates the forenamed problems, it is important that the display units be fast, reliable, virtually error-free, only contain prices consistent with the prices stored in the store's price database, require low maintenance and must be versatile to enable it to accomplish different combinations of displays and information. Prior art has heretofore been unable to sufficiently accomplish this.

In order for the cost savings to give the user a reasonable economic benefit or financial return, the initial purchase expense and the operational and maintenance expenses for the system must also be minimized. One means to best minimize costs is to minimize the number of complex and/or intelligent components. Prior art has heretofore been unable to sufficiently minimize either the initial purchase expense or the expenses associated with sustained operation and maintenance of the system. Our invention has achieved a relatively inexpensive and reliable information display system by utilizing relatively few complex and/or intelligent components and an automatic internal error detection means.

Prior attempts have heretofore been unable to develop a versatile information display system which sufficiently reduces or eliminates the high cost of the manual price changes/updates and product relocations reliably, efficiently and with a sufficient error detection and alarm system.

Our invention has greatly reduced or eliminated the shortcomings associated with prior attempts to automate the information display systems by providing a relatively fast, reliable, economical information display system which reduces the operational, maintenance and labor expenses to a much higher extent than prior art and the industry have thus far been able to achieve.

Our invention has achieved a relatively fast information display system by utilizing an addressing means which more efficiently transmits the information to the information display means and which displays the information in real time.

Our invention has greatly reduced the operational, maintenance and labor expenses by eliminating the need to go to the information display means to make most changes by allowing all changes to be made by one system operator from a central location. Our invention further reduces the maintenance requirements by utilizing less complex and non-intelligent display units which are powered from centralized standard power sources. The individual display means do not have to be individually programmed at the display location nor do they require a battery for their power source, which would also require periodic manual replacement.

Our invention is distinguished from prior art individually or any combination thereof by providing an apparatus and method which eliminates the problems relating to all prior art as discussed more fully herein.

SUMMARY OF THE INVENTION

Our invention generally provides a versatile information display system and method for displaying information on multiple information display means.

The information display system as contemplated by this invention generally comprises a system control means, one or more direct control means, multiple information display means and one or more display line means to facilitate the transmission of operating power and the information to be displayed to the information display means.

The system control means accesses and utilizes units of information from a source information database. The system control means combines each information unit with its own address code, thereby forming an addressed information unit. The address code identifies the direct control means, display line means and information display means where the information unit is to be displayed. The address code for each information unit is then utilized by the system control means to transmit each information unit to the designated direct control means and utilized by the direct control means to then store each information unit such that it can later be transmitted to its pre-designated information display means.

When the direct control means receives the proper command from the system control means to transmit the information units to the information display means, if necessary it converts the information to be displayed to the format required by the particular information display means and then serially transmits all the information units destined for one display line means. The information unit to be displayed on the most remote information display means on each display line means would therefore be the first transmitted and would serially pass through each of the intermediate information display means, cascading back to the display line means and then to the next information display means. This continues until all the information units designated for the information display means on one display line means are at their designated information display means.

Each information display means on the same display line therefore generally accepts the information units in the same data format, for instance in fifty-six bit serial data format. Once all the information units to be displayed on the same display line means have been received by the information display means and upon a signal from the direct control means, the information units are shifted to the display of the information display means for conversion to a visual image.

An object of our invention is to provide a versatile information control and display system which is adaptable to numerous configurations and which is capable of concurrently displaying numerous types and formats of information in multiple types of information display means. This object is accomplished through utilization of one system control means in combination with multiple programmable direct control means and the means it utilizes address codes in combination with the information units.

A still further object of this invention is to provide an information display system which is sufficiently flexible such that it can be configured and reconfigured during its useful life to adapt to different service requirements. The operation of this system can be altered because it can be programmed and reprogrammed from the system control means and has sufficient versatility such that additional or different routines, functions or options can later be added.

Another object of this invention is to provide such an information display system which operates reliably and with a sufficient error detection means. This object is accomplished by employment of an error detection function which periodically compares the information at the information display means with that in the direct control means. If a discrepancy is detected, an alarm message is sent to and interrupts the system control means and the system operator is alerted not only to the problem, but also to which display line means and information display means are involved.

Another object of this invention is to achieve such an information display system which minimizes the inspection, maintenance and operational labor costs by eliminating the need to physically go to each information display means for such tasks as changing or updating the information being displayed, changing batteries and programing or reprogramming the information display means. This invention achieves said objectives by utilization of one overall system control means and one or more intermediate direct control means, which transmit the information units and operating power to the information display means.

Another object of this invention is also to provide an information display system which can be produced as economically as possible. This is accomplished through the general system configuration and by designing the system to minimize the number of more expensive complex and intelligent components.

Other and further objects of our invention will appear from the specification and accompanying drawings which form a part hereof. In carrying out the objects of our invention, it is to be understood that its essential features are susceptible to change in design and structural arrangement with the preferred embodiment being illustrated in the accompanying drawings and described herein, as is required.

BRIEF DESCRIPTION OF DRAWINGS

In the accompanying drawings which form a part hereof:

FIG. 2 shows the master interface means' interface with the system control means computer;

FIG. 3 shows the master interface means' eight-bit comparitor and other electronic parts and circuitry;

FIG. 4 shows three of the six dual asynchronous receiver transmitter components and the means in which they are configured relative to the other components;

FIG. 5 shows the master interface means' circuitry for the interrupt signals from the direct control means and the interrupt controller;

FIG. 6 shows the master interface means' differential line drivers and receivers;

FIG. 7 shows master interface means circuitry and connector means;

FIG. 8 shows the central processing unit and the means in which it is connected to other components within the direct control means;

FIG. 9 shows the EPROM chip, two static RAM chips and the EEPROM chip within the direct control means;

FIG. 10 shows a communication adapter and communication drivers and receivers within the direct control means;

FIG. 11 shows the peripheral interface chip and other miscellaneous circuitry within the direct control means;

FIG. 12 shows the addressable latch, the latch decoders and the data selector chips which receive the information from the feedback line and related circuitry within the direct control means;

FIG. 13 shows signal line drivers and other circuitry within the direct control means;

FIG. 14 shows the buffer output chips and other circuitry within the direct control means;

FIG. 15 shows an example of the power relays and circuitry which can be used within the direct control means;

FIG. 16 shows one of the connector means which can be used within the direct control means;

DETAILED DESCRIPTION OF THE INVENTION

The information display system and method as generally contemplated by this invention comprises a system control means 1, one or more direct control means 2, multiple information display means 4 and one or more display line means 3 which facilitate the transmission of operating power and the information units from the direct control means 2 to the information display means 4.

This information display system and method, on startup, generally begins by the system control means 1 accessing and utilizing units of computer-based source information and combining each information unit with its own address code. The combination of the information unit and its address code, referred to as an addressed information unit, can then be transmitted to the direct control means 2 pre-designated by the address code.

The direct control means 2 receives and then stores or orders the information units such that when the information to be displayed on information display means 4 connected to one display line means 3 is transmitted, each information unit will end up at the information display means 4 designated by its address code.

When the direct control means 2 is commanded by the system control means 1 to transmit the information units to the information display means 4, the direct control means 2, if necessary, first converts the information units to the data format needed for the particular information display means 4 being utilized on a given display line means 3.

The direct control means 2 then serially transmits the information units to the display line means 3 in a data string such that the information unit pre-designated for the most remote information display means 4 on a display line means 3 is the first serially transmitted. That information unit is first received by the information display means closest to the direct control means 2, and when the next information unit is transmitted on the same display line means 3, the preceding information unit cascades to the next information display means 4 through the display line means 3, and so on until all the information display means 4 on the display line means 3 have received their information units. At that point the direct control means 2 can command the information display means 4 to load the information units into their display latches, thereby creating the visual images.

Many of the fastening, connection, circuitry, electronic components and other means utilized in this invention are widely known and used in the field of the invention described, and their exact nature or type is not necessary for an understanding and use of the invention by a person skilled in the art or science, and will not therefore be discussed in significant detail.

Figure 1:
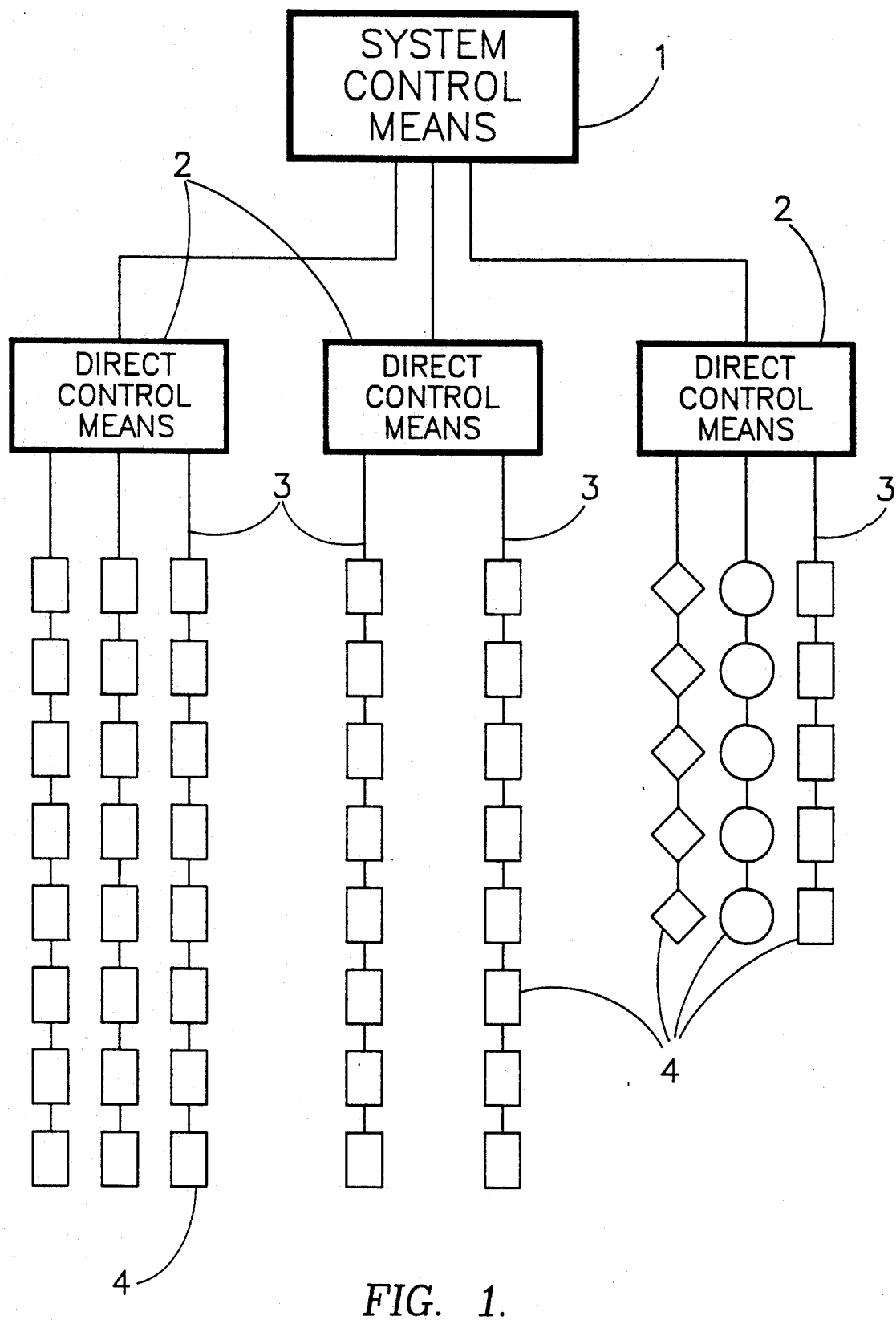
FIG. 1 is a block diagram showing a principal means of one application or configuration of this invention.

FIG. 1 shows a schematic diagram of one example of an information display system contemplated by this invention. The system control means 1 can however transmit addressed information units to and control up to sixteen direct control means 2. Each direct control means 2 transmits information to and controls up to sixteen display line means 3 and approximately one hundred twenty eight information display means 4 can be supported per display line means 3. This information display system invention can be expanded beyond the forenamed capabilities.

The information display system shown in FIG. 1 includes a system control means 1, three direct control means 2, multiple information display means 4 and multiple display line means 3 to facilitate the communication or transmission of power and information from and between the direct control means 2 and the information display means 4. FIG. 1 also shows the flexibility of the overall system to accommodate different numbers of and different types of information display means 4.

The primary components of the preferred system control means 1 to practice this invention are a computer, computer software, and a means to address to and interface with each of the direct control means 2. A specific type of or configuration for the system control means 1 is not necessary to practice this invention.

A preferred means to practice the system control means 1 computer functions of this invention, although not all of the components or features are necessary, is the use of an IBM-compatible personal computer with either an 8088, an 8026 or an 80386 microprocessor, dual RS-232 communication ports, a printer port, one megabyte of random access memory ("RAM") storage, a 20 megabyte hard disk, a monitor and a printer means.

The system control means 1 contemplated by this invention accesses the source information units, which can be located in an internal or external source. The information units will generally be contained in some form of database. The system control means 1 then combines each information unit with its own address code, thereby forming an addressed information unit. In forming the addressed information units, the system control means 1 software also creates its own database comprised of all the addressed information units. The system control means 1 can then transmit each of the addressed information units to the direct control means 2 designated by its address code. Each information unit the system control means 1 accesses should contain at least that information intended to be displayed on one information display means 4.

The input and output routines for the system control means 1 computer can be accomplished by a number of different means, including, without limitation: modifying the system control means 1 computer by adding a read only memory ("ROM"), which contains low level BIOS functions or routines to control the interface with the direct control means 2; or including the system control means 1 input and output routines in the system control means 1 software by altering the communication protocol formats.

If the low level BIOS functions of the system control means 1 computer are modified by the addition of ROM, the computer essentially treats the added ROM as one of its own memory locations. One means to accomplish the ROM input and output routines is the software listing set forth in Table VI, at the end of this detailed description of the invention.

The input and output routines for the system control means 1 computer can also be accomplished utilizing known C language low level interrupt routines as terminant stay resident programs. In an application of this invention to retail store price display systems, the system control means 1 may interface with and access the information units from the store's computer price database. The connection thereto can be accomplished by using a number of different known means, including, without limitation, the use of standard serial transmission communication ports, fibre optics, etc. This invention contemplates the source information database be located either in an external or an internal storage media.

If the information units also contain the UPC bar code, which they typically will in retail store price display application of this invention, the system control means 1 will receive the UPC bar code as part of the information unit for each particular item of goods. The bar code may then be utilized by the system control means software as a means to identify which address code should be combined with each information unit. The address code identifies the direct control means 2, display line means 3 and information display means 4 or product location in the store.

The source information database need only be in such form such that the system control means 1 can access it and receive and process the information units. Depending upon the format of the source information, such as binary or ASCII, the system control means 1 may also need to convert the information into a format it can read and this can be accomplished by several known means.

To perform the primary system control means 1 functions, the system control means software can be written in a number of different computer languages and in a number of different means. A C language software listing for the retail store price information display application of this invention is set forth in the microfiche appendix labeled as "Appendix #1 Information Display System 1".

The preferred system control means 1 software generally performs or initiates the following general functions: combine each information unit with its own predesignated address code, thereby forming addressed information units; transmit or initiate transmission of each addressed information unit its designated appropriate direct control means; interface with and transmit the various commands to the appropriate direct control means; initialize the system operating parameters; setup and write to the direct control means 2 software.

In order to facilitate the operation of the system control means 1, the software for the preferred application of this invention can be menu driven, thereby reducing the requisite skill level and training required for the operator. The menu for a preferred retail store price display application of the invention contains seven general operational headings or selections, including: FILE; EDIT; TRANSMIT; DIAGNOSTICS; ALARM; PARAMETERS; and EXIT. Each of the headings or selections contain options to perform certain tasks and a show options selection is available to display which options are available under each heading.

The heading FILE for instance could contain the options of: Load Price Data; Save Price Data; Delete Price Data File; Directory; Change Directory; and Download From Source Information Database. The Load Price Data option asks for the filename and if the filename keyed in does not exist or cannot be found, it again asks for the proper filename. If the filename typed in is found, the price information is loaded.

When selected, the Save Price Data option asks the operator for the filename of the information to be saved and saves the information to the storage means. When selected, the Delete Price Data option asks the operator for the filename of the information file to be deleted and then deletes that file from the storage means. The Directory option displays a list of the price information fields contained in the storage means.

When selected, the Change Directory option asks the operator for the new subdirectory to change to and then changes to the designated directory. The Download From Source Information Database option asks the operator for the price information filename, receives the price information from the source information database, including its UPC code, applies the address code to the price information and then saves the new file to its internal memory storage.

The EDIT heading contains the following options: Select Price Information; Edit Price; Append Price; and Delete Price. The Select Price Information option asks the operator for the UPC, the location code or the record number to search for, and then locates the record and places it into the current transmit buffer. The Edit Price option edits the price information that is in the current transmit buffer.

The Append Price option sets the current record to the end of the database and then appends new information to the database. The Delete Price option deletes the price information which is in the current transmit buffer.

The TRANSMIT heading contains the options of Transmitting a Single Information Unit or Transmitting All Information Units. The Transmission of a Single Information Unit option involves transmitting the information unit in the current transmit buffer to the direct control means 2 designated by the address code. The Transmission of All Information Units option sends all addressed information units, one at a time, to the direct control means 2 designated by the address code for each and sends the appropriate update commands to all direct control means to update their price information.

The DIAGNOSTICS heading contains the following options: Serial Port Diagnostic; RAM Diagnostic; Line Diagnostics; Bit Set/Reset; and Reset Direct Control Means. The Serial Port Diagnostic option involves asking the operator which direct control means port to test and running the diagnostic test until the escape key is pressed. The RAM Diagnostic option involves asking the operator which direct control means RAM to test and running the test until the escape key is pressed.

The Line Diagnostic option involves asking the operator which direct control means to test and which display line means to test and then performing the test until the escape key is pressed.

The Bit Set/Reset option involves asking the operator which direct control means to test and which display line means to test and then using the 0 key and the 1 key to run the test until the escape key is pressed. The Reset Direct Control Means option involves asking the operator which direct control means to reset and then resetting the direct control means.

The ALARM heading includes the options of Show Alarm and Reset Alarm. The Show Alarm option involves inquiring whether an alarm message is showing, and if yes is typed in response to the inquiry, displaying which direct control means, which display line means and which information display means failed.

The Reset Alarm option involves clearing the alarm message and sending a command to the direct control means to retry the display line means which is indicated to have failed.

The PARAMETER heading includes the following options: Write Parameters; Write Driver Data to Direct Control Means; and Write Conversion Table to Direct Control Means. The Write Parameters option involves asking the operator for the direct control means number, displaying the parameter options or submenu, waiting for information to be keyed in by the operator and then sending the operating parameter data to the direct control means.

The Write Driver Data to Direct Control Means option involves asking the operator for the direct control means number, the display line means number and the driver filename, and then sending the appropriate driver to the designated direct control means 2 to drive the designated display line means 3.

The Write Conversion Table to Direct Control Means option involves asking the operator for the direct control means number, selecting the conversion table and then sending the data to the designated direct control means 2.

The EXIT heading includes the two options of Exit Yes and Exit No. The Exit Yes option ends the program and returns to the operating system of the system control means 1 computer, such as DOS. The Exit No option terminates the execution of the exit heading.

The preferred system control means 1 also includes an interface means, which has the primary functions of: bi-directional information conversion and transfer between the system control means 1 and each direct control means 2; and directing each addressed information unit to the appropriate direct control means 2 based upon its address code. The interface and addressing means functions necessary to practice this invention can be accomplished by different means.

The interface means receives the addressed information units from the system control means 1 software in parallel format and converts each to serial format and transmits them to the designated direct control means 2. An example of an application of the interface means shown in FIG. 2 through FIG. 7 utilizes Dual Asynchronous Receiver Transmitters ("DART'S") to accomplish the actual conversion function.

A preferred interface means also receives serially formatted information from a direct control means 2, converts it to parallel data format and communicates it to the system control means 1 software. Information received from a direct control means 2 will generally be system interrupt information or information about the operation of a direct control means 2.

The interface means is generally comprised of a master interface means and additional slave interface means communicatively connected to the master. The functions of the master interface means and each slave interface means can be accomplished by different means, including on a circuit board that fits into one of the available expansion slots in the system control means 1 computer. The master interface means and each slave interface means can perform the bi-directional information conversion and transfer functions for up to twelve direct control means 2, and the system control means 1 can be configured with eight or more interface means. There may also be commercially available products capable of performing some or all of the functions of the interface means.

FIG. 2 through FIG. 7 are circuit schematic diagrams for a preferred means to accomplish the master interface means functions as contemplated by this invention. The master interface means shown can operate and control up to twelve direct control means 2. The system control means 1 will have one master interface means and seven or more slave interface means. The slave interface means are daisy-chain connected to the master interface means, with the slave board addresses being offset from one another for addressing purposes. The slave interface means are almost the same as the master interface means, with some slight differences as set forth more fully herein.

The information being transmitted from the system control means 1 first goes through the master interface means and, depending on which direct control means 2 is the recipient designated by the address code, will be transmitted through the appropriate slave interface means.

Figure 2:
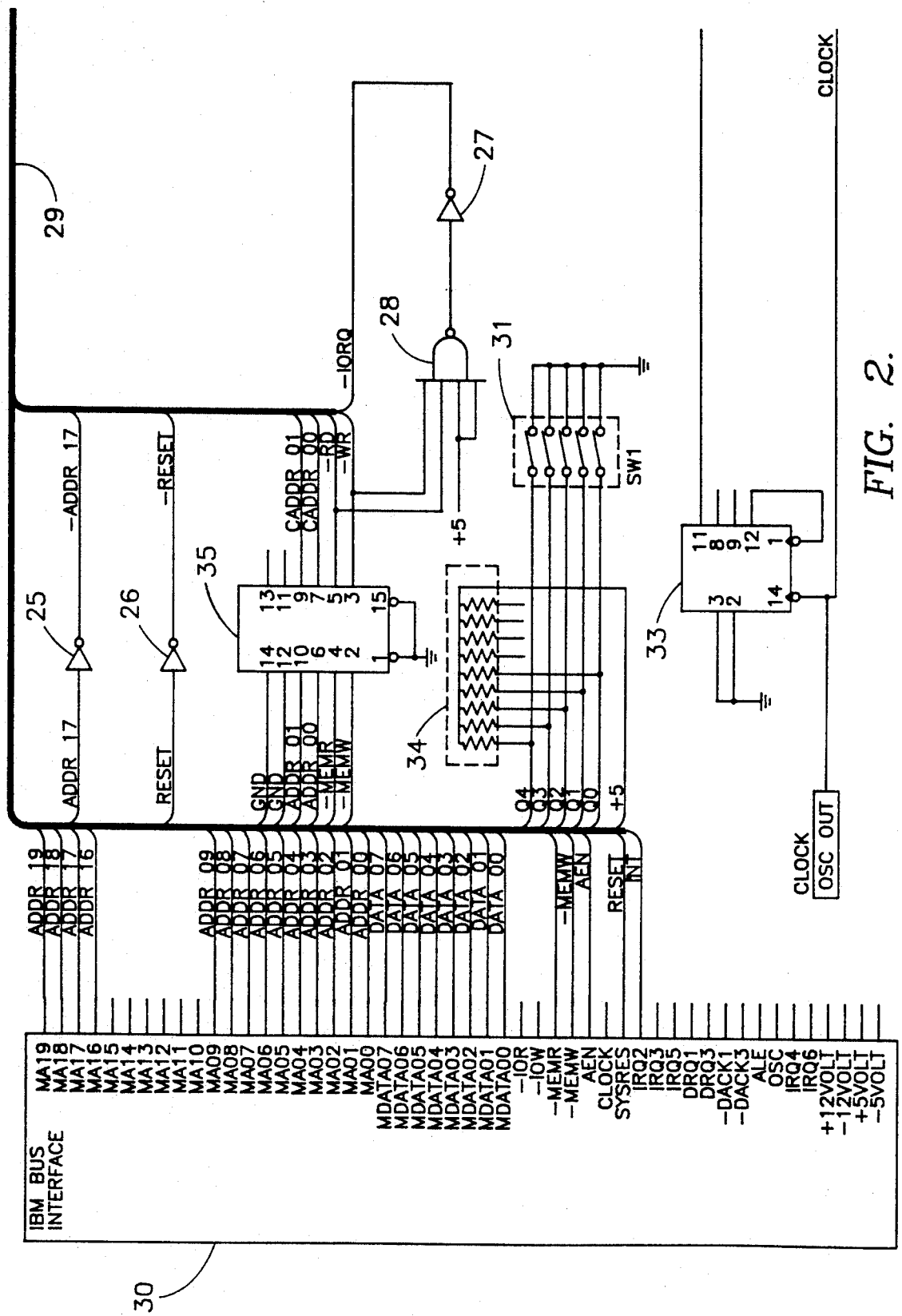
FIGS. 2 through 7 show partial schematic circuit diagrams of one means to practice the master interface means within the system control means and its components and circuitry, as set forth more fully herein.

FIG. 2 shows the interface bus 30 for the IBM compatible computer expansion slots, addressing circuitry for the DART'S, the memory selection address switch 31 and a clock arrangement. Transistor-transistor logic ("TTL") chip Schottky hex buffer (74LS367) 35, the clock, the TTL asynchronous four bit binary counter (74LS93) 33 and the system control means bus 29 are also shown. The memory selection address switch 31 is used to select the address offset and to select different slave interface means identification codes when slave interface means are used.

FIG. 2 also shows 10K single in line package resistor configuration (DRPAC9) 34, TTL hex inverters (74LS04) labeled as items 25, 26 and 27 and NAND gate (74LS20) 28 are also shown.

Figure 3:
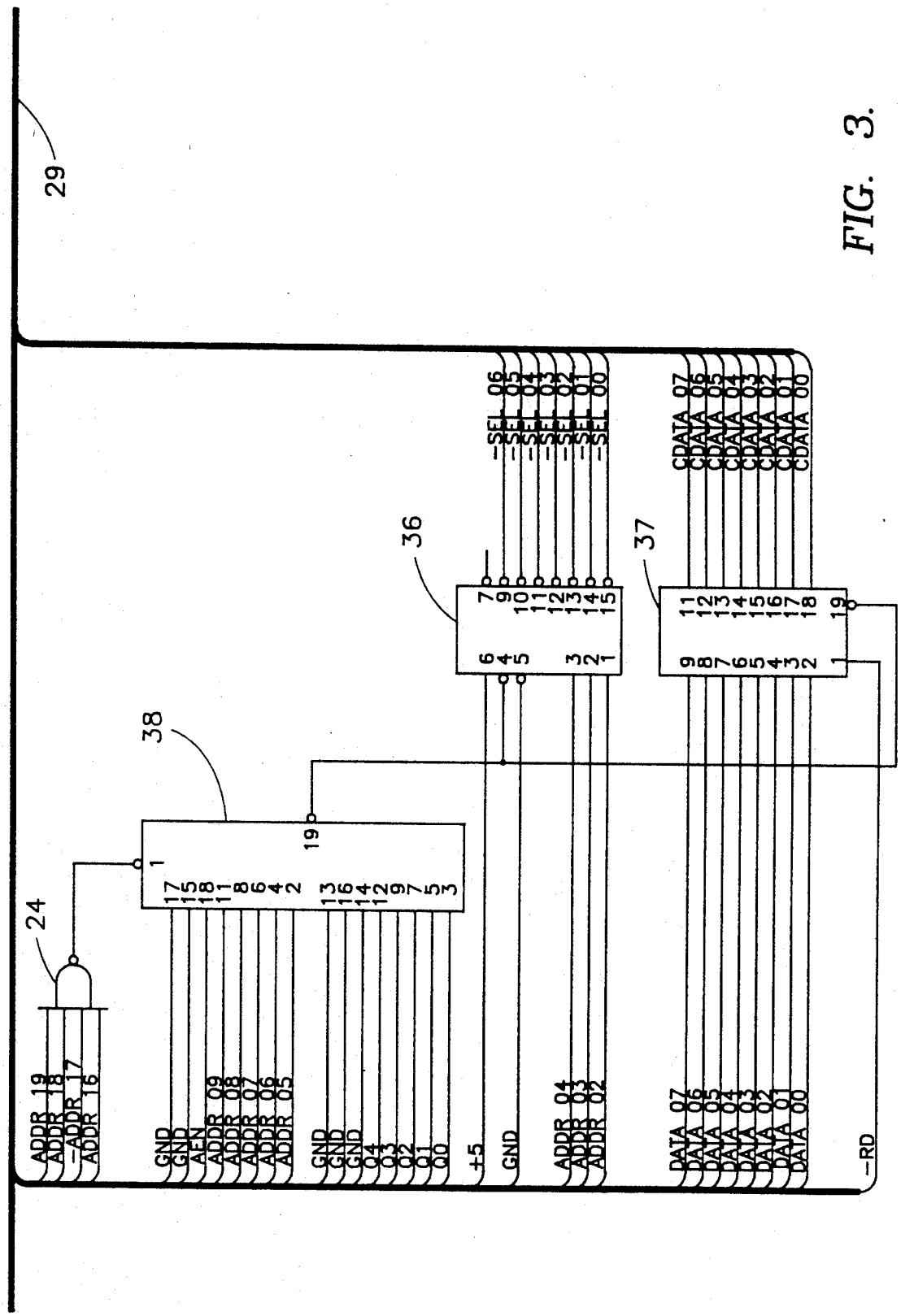

FIG. 3 shows the eight bit comparator (74LS688) 38 which compares the switch data from the memory selection address switch 31 with the address bus. A Schottky decoder/demultiplexer (74LS138) 36, a Schottky octal non-inverting bus transceiver (74LS245) 37 and NAND gate (74LS20) 24 are also shown.

Figure 4:
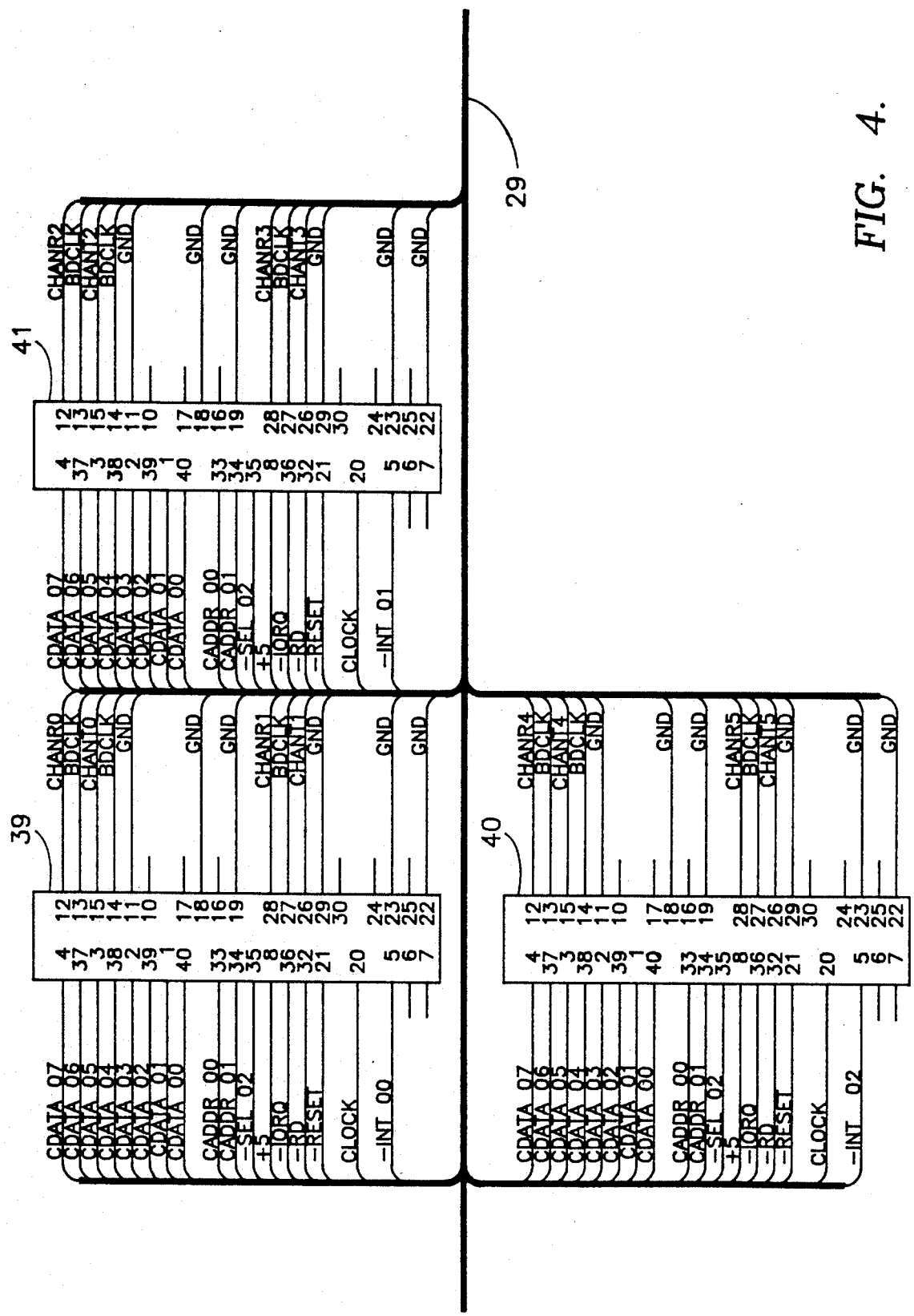

FIG. 4 shows three of the six dual asynchronous receiver transmitters ("DART'S"), items 39, 40 & 41, and the means they are connected relative to the other circuitry.

Figure 5:
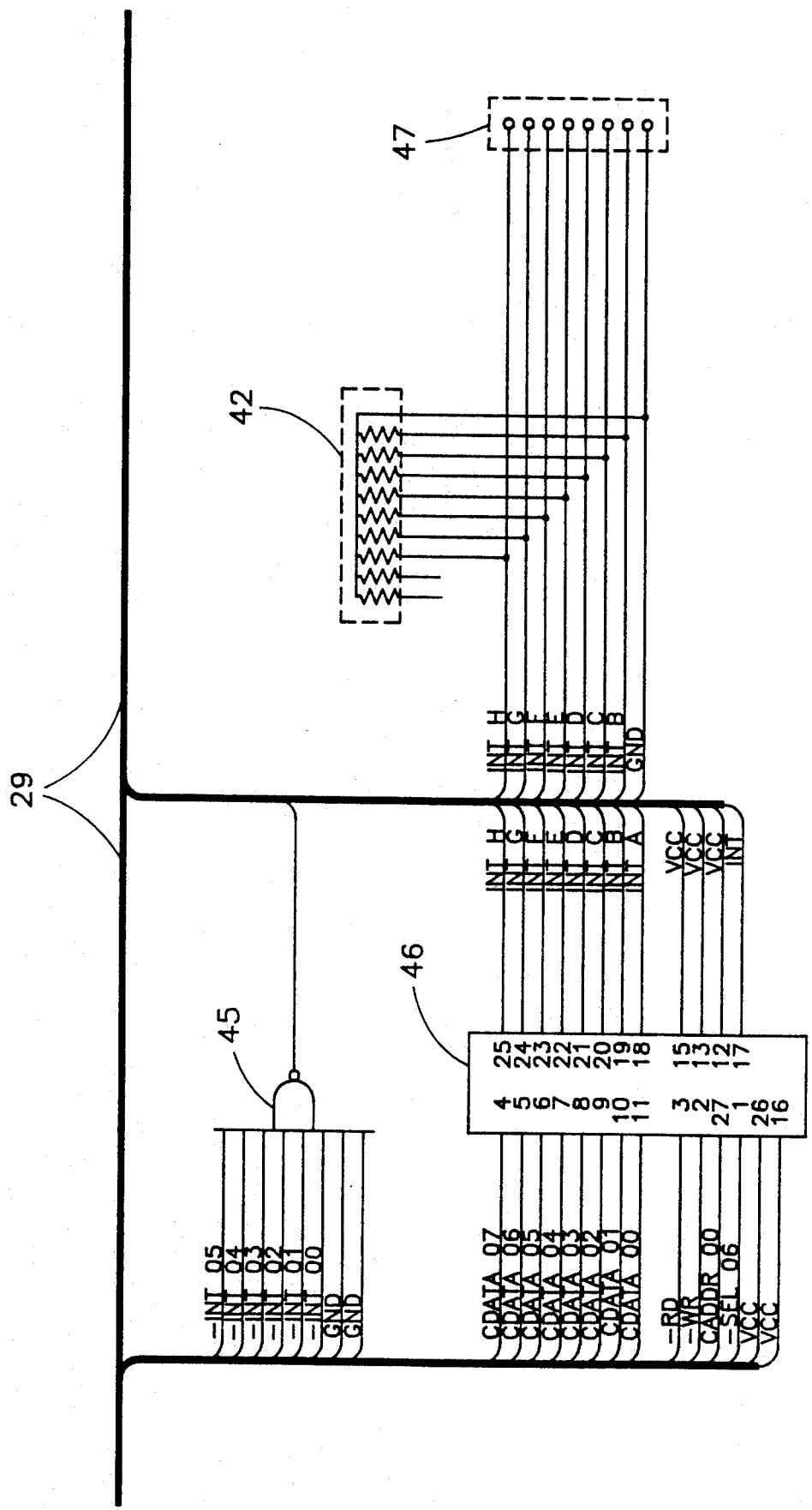

FIG. 5 shows the interrupts from the DART'S being converted into one interrupt by NAND gate (74LS30) 45, which is then transmitted to an interrupt controller (8259) 46. When the interrupt controller 46 receives an interrupt signal, it interfaces with the CPU of the system control means 1 computer, which then causes the system's interrupt routines to operate. The slave interface means will not include interrupt controller 46 or NAND gate 45. FIG. 5 also shows an edge connector 47 for adding more interface means to the system control means 1 and 10K single in line package resistor configuration (DRPAC9) 42.

Figure 6:
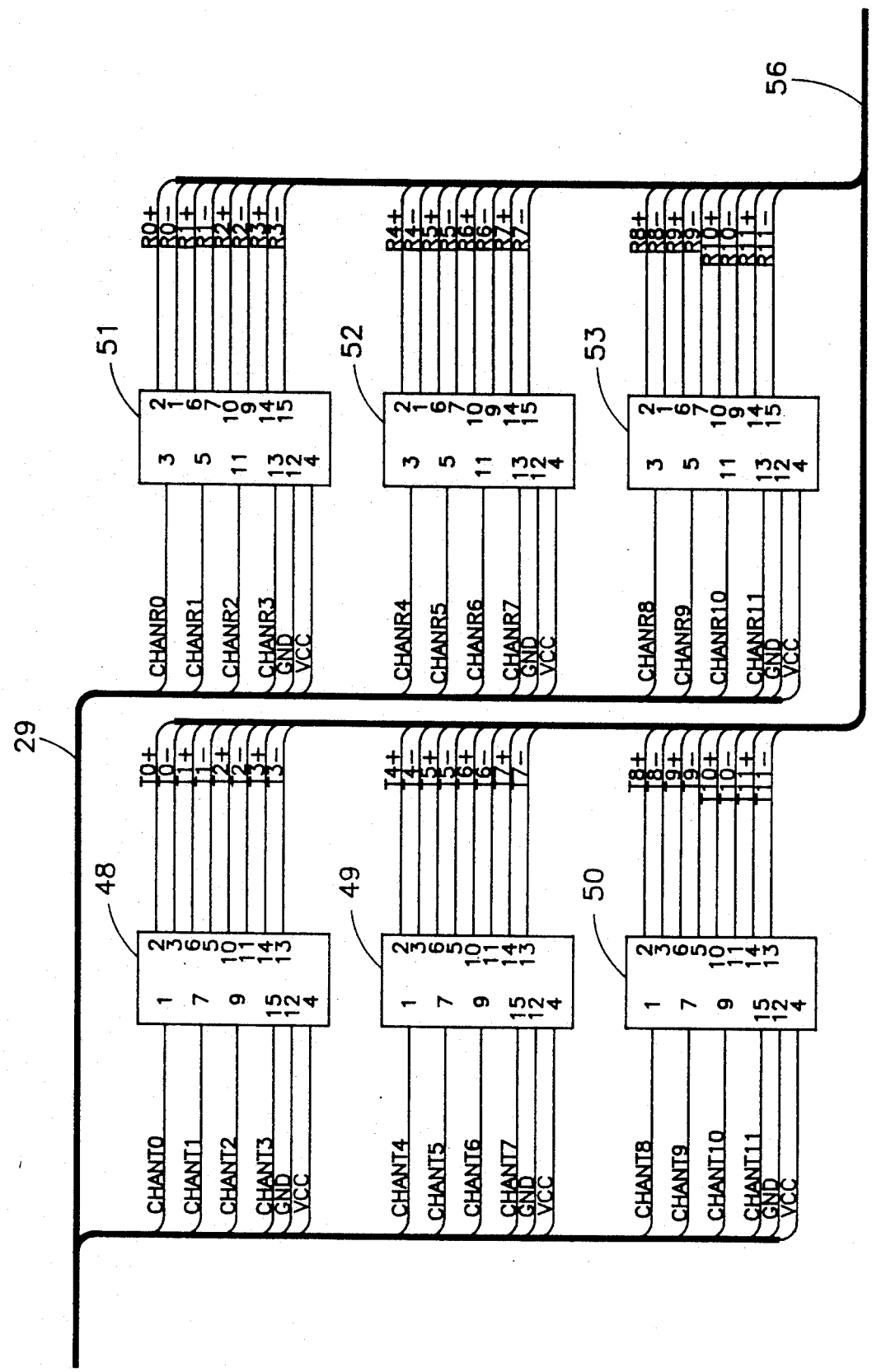

FIG. 6 shows the quad differential line drivers (DS26LS31), items 48, 49 and 50, and the quad differential line receivers (DS26LS32), items 51, 52 and 53, and an RS-422 standard format line 56.

Figure 7:
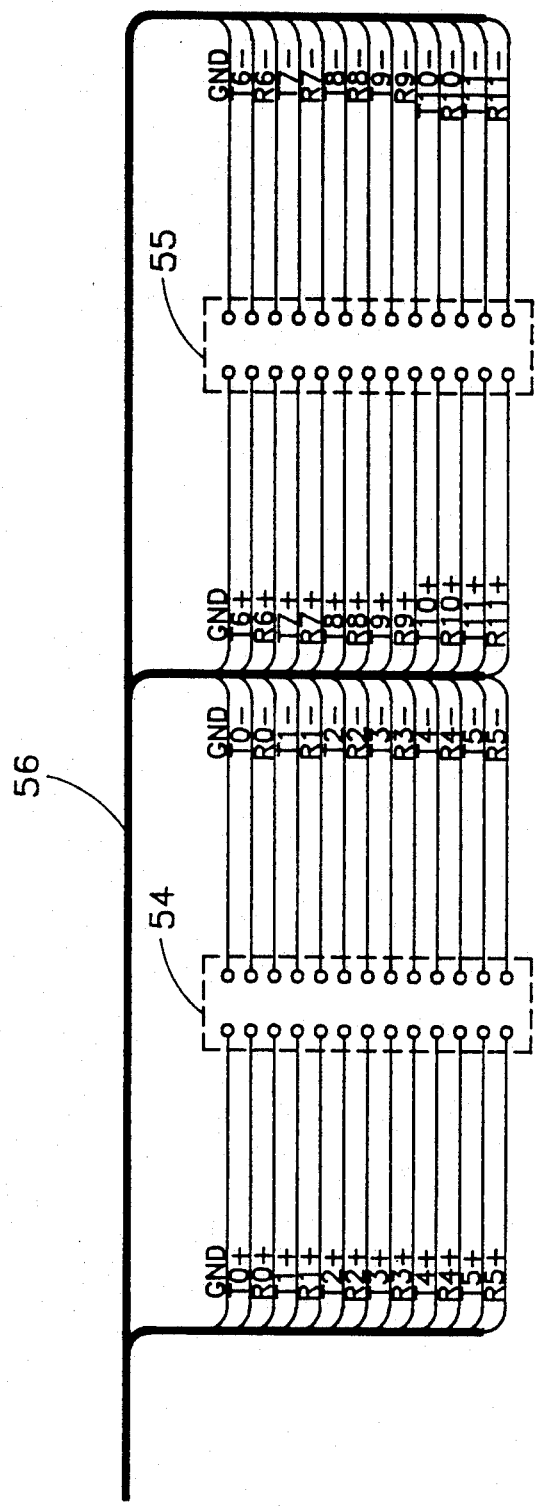

FIG. 7 shows the two connectors, items 54 and 55, for the interface means and the RS-422 standard format line 56.

A preferred memory map means in hexadecimal format which may be used for the master interface means within the system control means 1 is set forth in Table I.

TABLE I

| Address | Description | |
|---|---|---|
| D0000 Hex | Channel 0 | Data Register |
| D0001 Hex | Channel 0 | Control Register |
| D0002 Hex | Channel 1 | Data Register |
| D0003 Hex | Channel 1 | Control Register |
| D0004 Hex | Channel 2 | Data Register |
| D0005 Hex | Channel 2 | Control Register |
| D0006 Hex | Channel 3 | Data Register |
| D0007 Hex | Channel 3 | Control Register |
| D0008 Hex | Channel 4 | Data Register |
| D0009 Hex | Channel 4 | Control Register |
| D000A Hex | Channel 5 | Data Register |
| D000B Hex | Channel 5 | Control Register |
| D000C Hex | Channel 6 | Data Register |
| D000D Hex | Channel 6 | Control Register |
| D000E Hex | Channel 7 | Data Register |
| D000F Hex | Channel 7 | Control Register |
| D0010 Hex | Channel 8 | Data Register |
| D0011 Hex | Channel 8 | Control Register |
| D0012 Hex | Channel 9 | Data Register |
| D0013 Hex | Channel 9 | Control Register |
| D0014 Hex | Channel 10 | Data Register |
| D0015 Hex | Channel 10 | Control Register |
| D0016 Hex | Channel 11 | Data Register |
| D0017 Hex | Channel 11 | Control Register |
| D0018 Hex | INTERRUPT CONTROLLER INITIALIZATION REG. | |
| D0019 Hex | INTERRUPT CONTROLLER OPERATION REG. | |

A preferred memory map means which may be used for a slave interface mans within the system control means 1 is set forth in Table II.

TABLE II

| Address | Description |
|---|---|
| D0000 Hex | Master Interface Means |
| D0020 Hex | First Auxiliary |
| D0040 Hex | Second Auxiliary |
| D0060 Hex | Third Auxiliary |
| D0080 Hex | Fourth Auxiliary |

The interface means of the system control means may be communicatively associated with the direct control means 2 by a number of different means, such as by RS-422 electrical standard transmission means, direct wire, fiber optic transmission, radio frequency connection, etc.

The information units can be in a number of different formats and can also be converted to the format readable by the information display means 2 before leaving the system control means 1. In the retail store price information display example of this invention shown, the addressed information units transmitted by the system control means 1 are in six-byte format and the address codes or location information, the information to be displayed and any control bits are contained within the six-bytes.

The six-byte configuration is substantially as follows. The first byte contains the display line means 3 number and the second byte contains the information display means 4 number for that display line means 3. Bit four of the upper nibble of the third byte contains the bit that controls whether the information display means 4 will flash on and off and bit five of the upper nibble of the third byte contains the bit that controls blanking out the information display means 4. The lower nibble of byte three contains the seventh digit for the display.

The upper nibble of byte four contains the sixth digit of the price display while the lower nibble contains the fifth digit. The upper nibble of byte five contains the fourth digit of the price display while the lower nibble contains the third digit. The upper nibble of byte six contains the second digit of the price display while the lower nibble contains the first digit.

This invention contemplates one or more intermediate storage and control means which can perform the same or similar functions relative to multiple and different types of information display means. The intermediate storage and control means are referred to as a direct control means 2.

The programmability and re-programmability of the direct control means 2 from the system control means 1 gives the overall information display system the flexibility to easily and centrally change the system parameters and the information being displayed. It also allows a multitude of additional and different functions and features to be programmed into the information display system via the direct control means 2.

There are numerous means to practice the direct control means 2 contemplated by this invention. The direct control means 2 generally performs the functions of: receiving the addressed information units and storing the information units such that each information unit may be transmitted to the information display means 4 pre-designated by its address code; if necessary, convert the information unit to a format readable by whatever type of information display means 4 is being utilized; and transmitting the information unit to its pre-designated information display means 4. The preferred direct control means 2 performs functions in addition to the foregoing, as set forth more fully herein.

When the system control means 1 transmits the command to the direct control means 2 software, instructing it to update the information being displayed, the direct control means 2 converts the information units to a format readable by the particular type of information display means(s) being used on that display line means 3 and serially transmits the information units through the display line means 3 to the information display means 4.

An example of a driver to accomplish this conversion is set forth in Table VII at the end of the detailed description of the invention.

Other additional functions of the direct control means which are preferred for system operation are: diagnostic testing of the display line means 3 and the information display means 4; means to program and re-program the operating parameters, such as the number of display lines and information display means 4; and a means to detect errors in the information transmitted to each information display means 4.

A preferred means to practice the direct control means 2 for a retail store price information display system utilizes direct control means 2 software, a listing of which is provided in the accompanying appendix, labeled as Appendix #2 and the software flow charts.

The system control means 1 software interfacing with the direct control means 2 software uses certain commands or protocols to control or initiate the functions of the direct control means 2. In the preferred retail store application of this invention, the command protocols shown in TABLE III may be used by the system control means 1 to cause the direct control means 2 to perform the functions indicated.

TABLE III

Initialize direct control means: OE Hex
Send single information unit to direct control means: 01 Hex
Send multiple information units to direct control means: 02 Hex
Transmit information to be displayed to all information display means: 03 Hex
Transmit information to be displayed to the information display means on one display line means: 04 Hex
Diagnostic serial data transmission check with system control means 06 Hex
Send status of direct control means to system control means 07 Hex
Reset display line means error and retry: 08 Hex
Send operating parameters to direct control means: 09 Hex
Send display line means driver to direct control means 0A Hex
Send four to seven bit conversion table to direct control means 0B Hex
Check direct control means RAM: 0D Hex
Reset direct control means: OE Hex From Table III above, to send one addressed information unit to the direct control means 2, the command 01 Hex is used, which causes the direct control means to get the display line means 3 number byte and the information display means 4 number byte from the serial port, utilizing them to form a memory address for the retail price information, which is in four-byte format. The direct control means 2 software then gets the four-byte retail price information from the serial port and stores it in its memory, i.e. the two 8k by eight static RAM chips 66 & 68.

To send multiple addressed information units to the direct control means 2, the system control means 1 software uses the command 02 Hex and performs the same steps as when it sends a single information unit, except an additional step would be added which would check the serial port for a termination code. If a termination code is present, the system will return from the interrupt routine, whereas if the termination code is not present, the system will go back to the first step again and get a second information unit.

To command the direct control means 2 to transmit all the information units to all the information display means 4, the command 03 Hex is used, which causes the direct control means 2 to set all line update flags to binary 1.

In the preferred retail store price information display example of this invention, the direct control means 2 software can use the commands set forth in Table II to send information to the system control means 1.

TABLE IV

Send Display Line Means Error to system control means: 00 Hex
Serial Transmission Error: 01 Hex
Bad Command Sent to Direct Control Means: 02 Hex
Notify that Z80 CPU has failed: 03 Hex
Notify that direct control means RAM has failed: 04 Hex The direct control means 2 may also include an error detection function, such that if a discrepancy is detected between the information being displayed on all the information display means 4 on one display line means 3 and that stored by the direct control means 2 for that display line means 3, an error code will be sent to the system control means 1, triggering an interrupt routine and thereafter notifying the system operator. The system will then disconnect the operating power to the display line means 3 from which the error was detected.

To perform the error detection function, the direct control means 2 transmits all the information units in information display means 4 on one display line means 3 a second time, causing the first transmission to be shifted out of the information display means 4 through the feedback line 111, and returned to the direct control means 2, where the comparison can be made.

Figure 8:
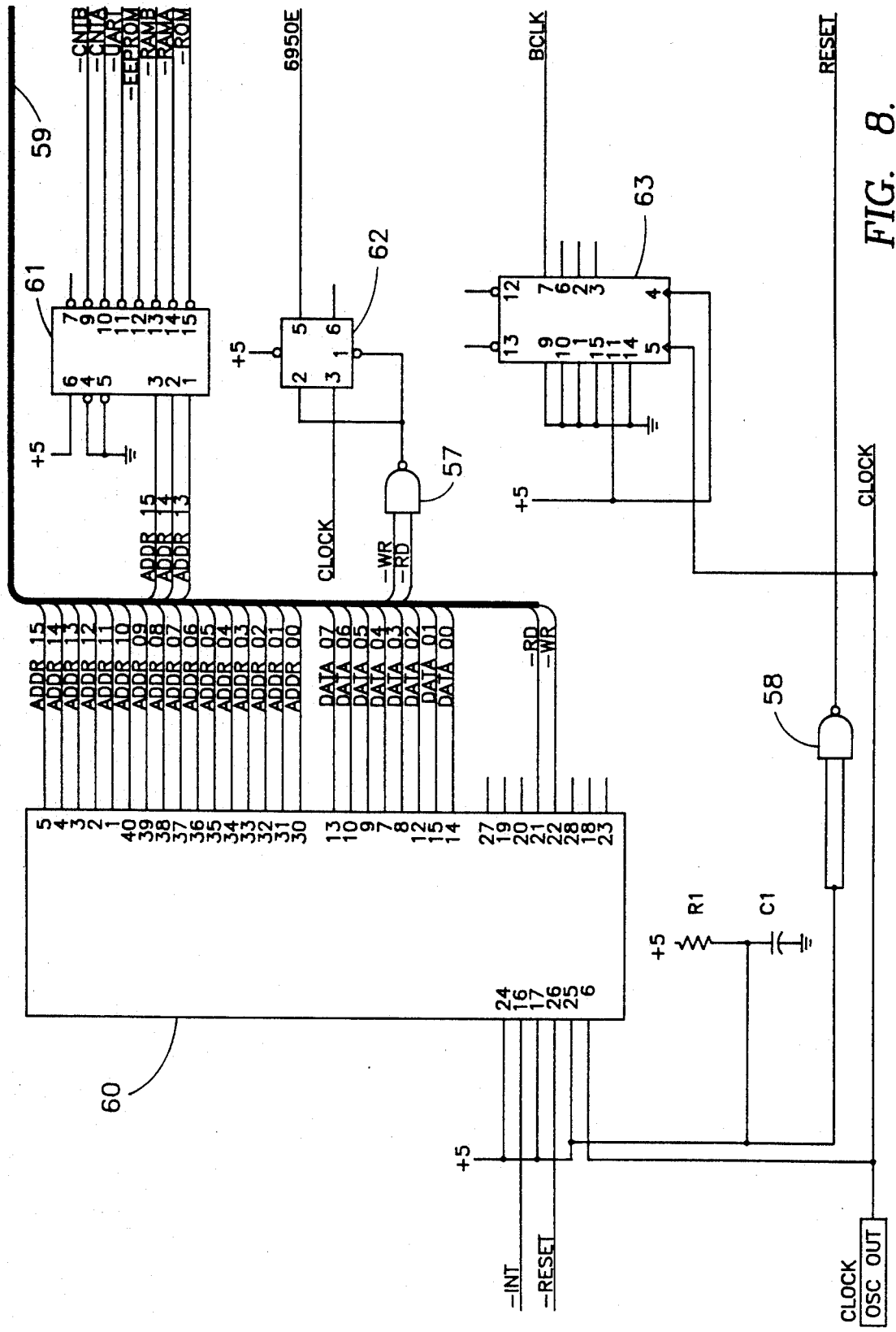
FIGS. 8 through 16 show partial schematic circuit diagrams of one means to practice the direct control means and its components and circuitry.

FIG. 8 through FIG. 16 show a preferred means to accomplish the functions of a direct control means 2. FIG. 8 shows the Z80 central processing unit (hereinafter "CPU") (MK3880) 60, a Schottky decoder/demultiplexer (74LS138) 61, a dual D-type flip flop (74LS74) 62 which enables the asynchronous communications interface adapter (6850) 70 shown in FIG. 10, a binary up-down clock counter 63, NAND gates (74LS00) 57 and 58, and the system bus 59.

In FIG. 8, the values believed most advantageous for said application are 22k for resistor R1 and 10UF for capacitor C1, although there may be many alternative values.

Figure 9:
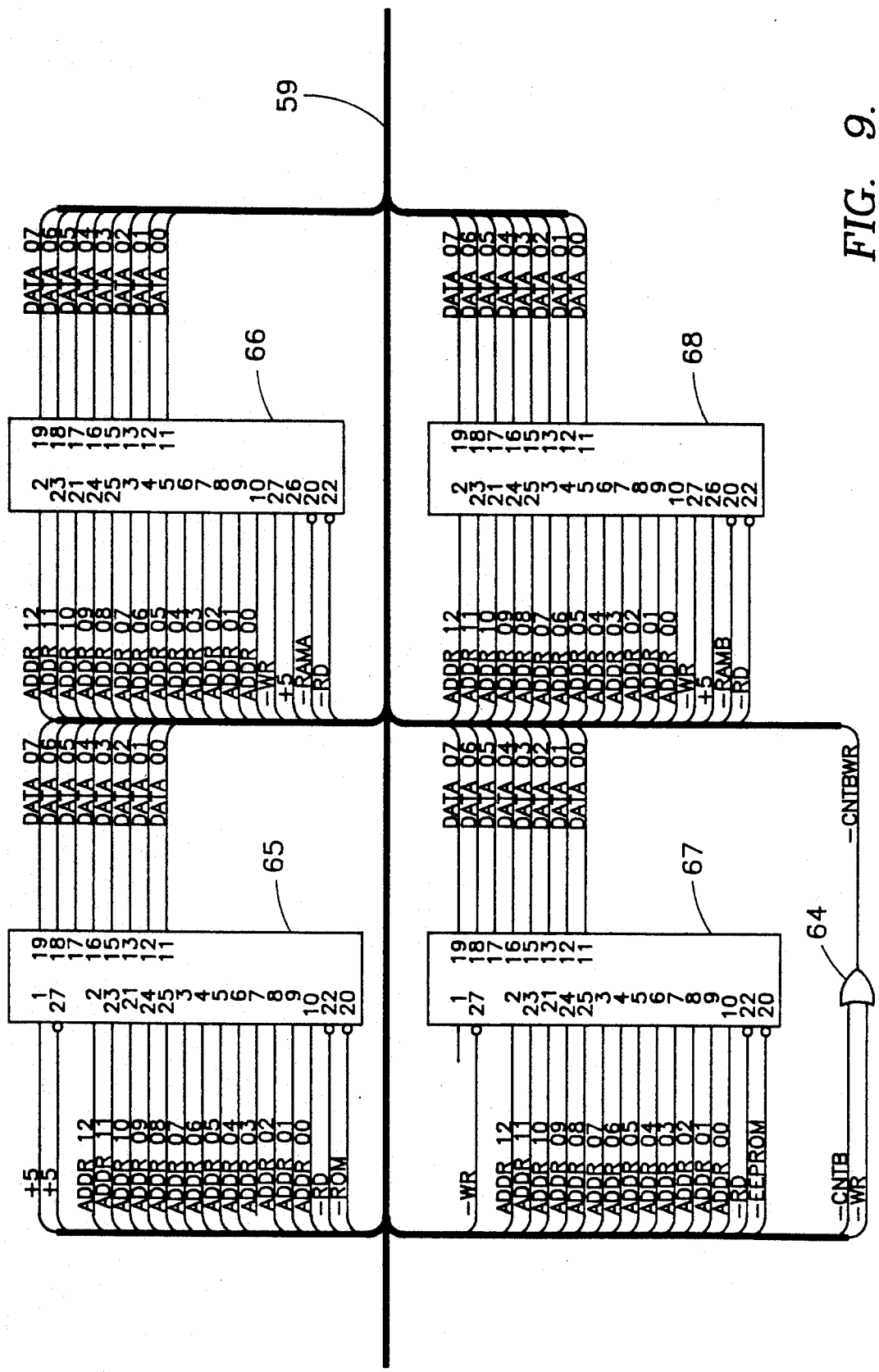

FIG. 9 shows the 8k by eight EPROM (2764) 65, two 8k by eight static RAM chips (6164) 66 & 68, OR gate (74LS32) 64 and an 8k by eight single-supply EEPROM chip (9864) 67. The 8k by eight EPROM (2764) 65 primarily holds the direct control means BIOS functions. The two 8k by eight static RAM chips (6164) 66 & 68 provide the storage means for the information to be displayed and the 8k by eight EEPROM chip (9864) 67 primarily holds the direct control means 2 system parameters and the direct control means 2 drivers, as described more fully herein.

Figure 10:
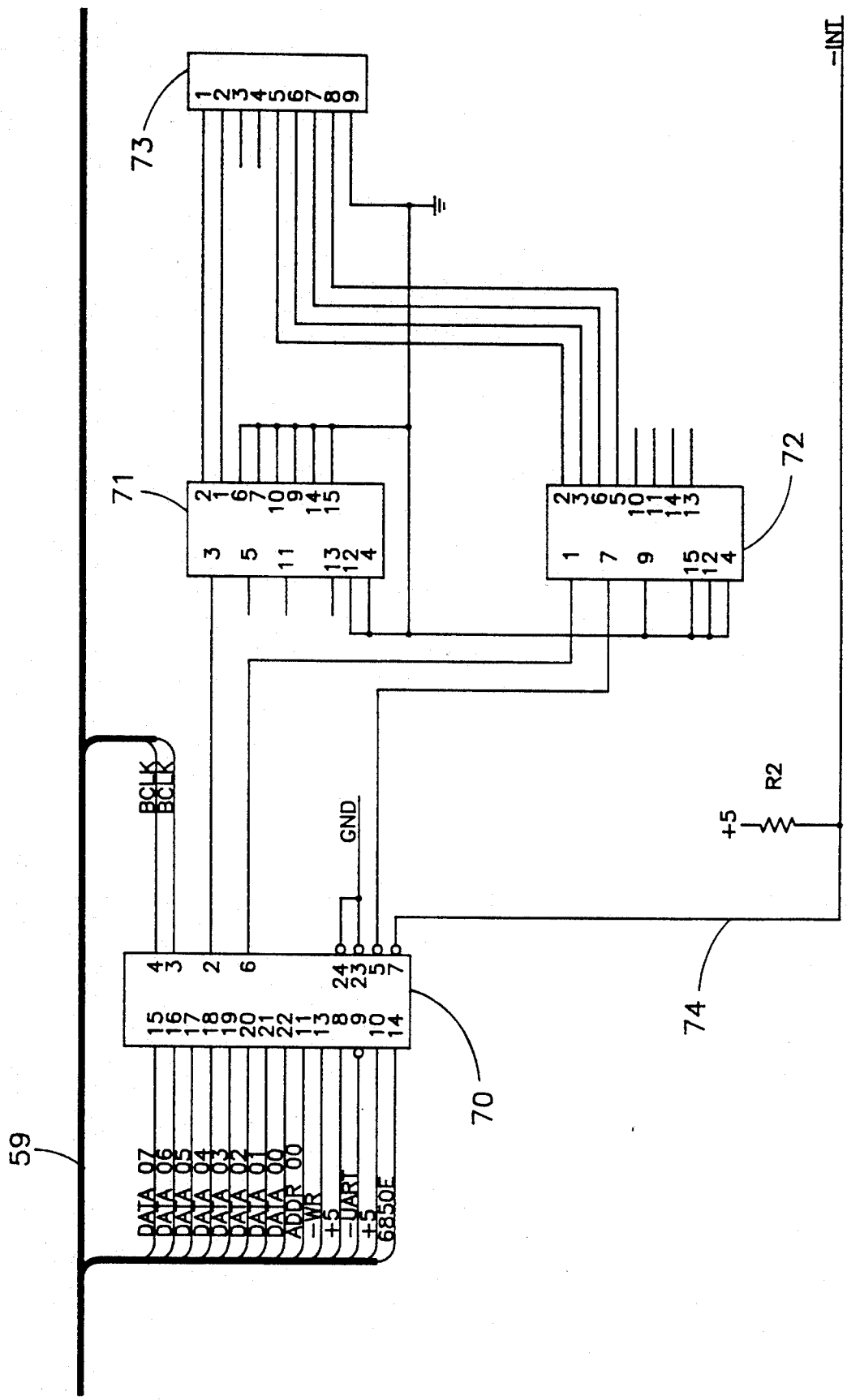

FIG. 10 shows an asynchronous communications interface adapter (6850) 70, which communicates with the system control means 1 through the quad differential line driver (DS26LS31) 71 and quad differential line receiver (DS26LS32) 72. The nine-pin connector interface 73 to the system control means 1 is also shown. The output line 74 is the means by which an interrupt signal is sent to the Z80 CPU.

In FIG. 10, the value believed most advantageous for said application is 1k for resistor R2, although there may be many alternative values.

Figure 11:
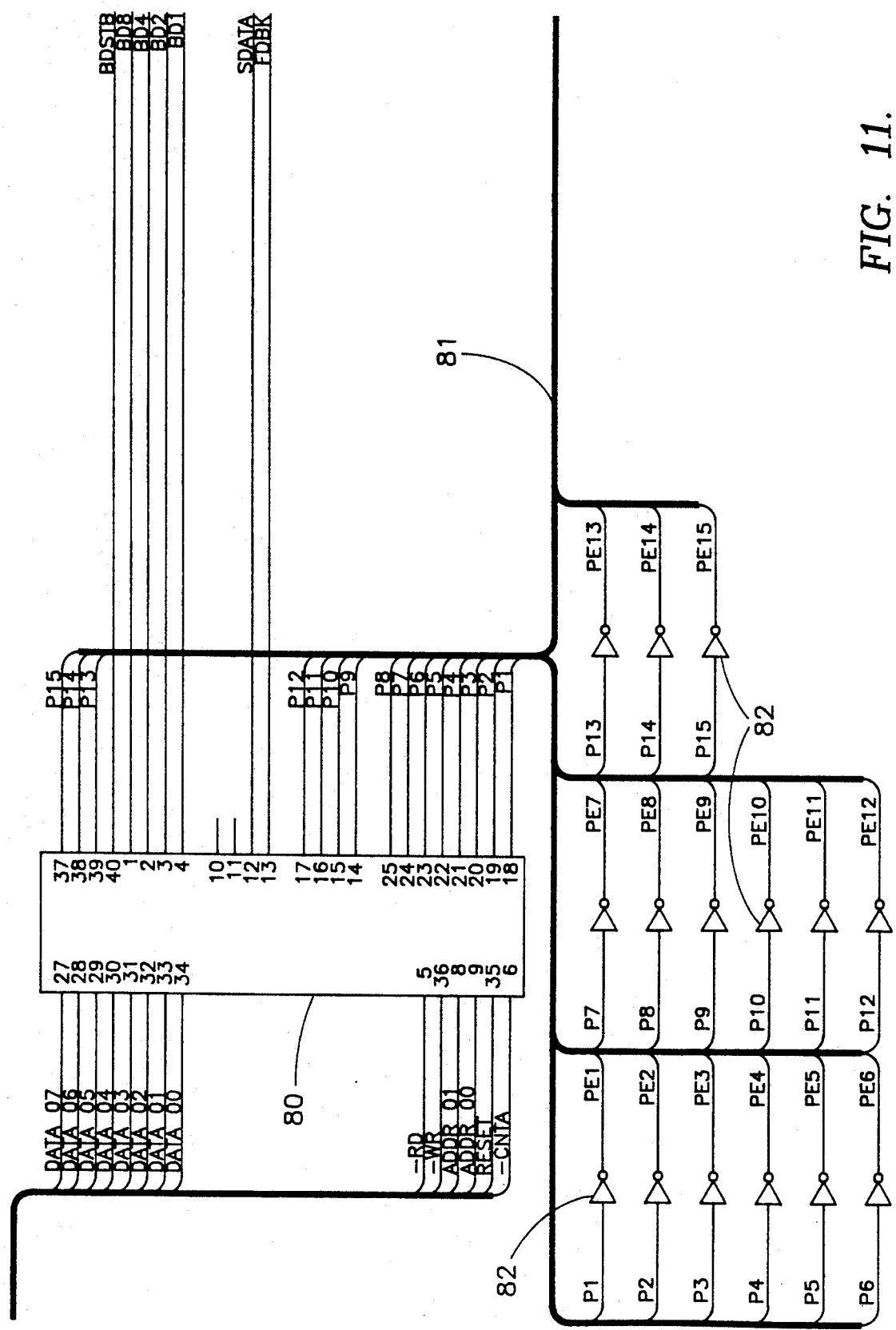
Figure 15:
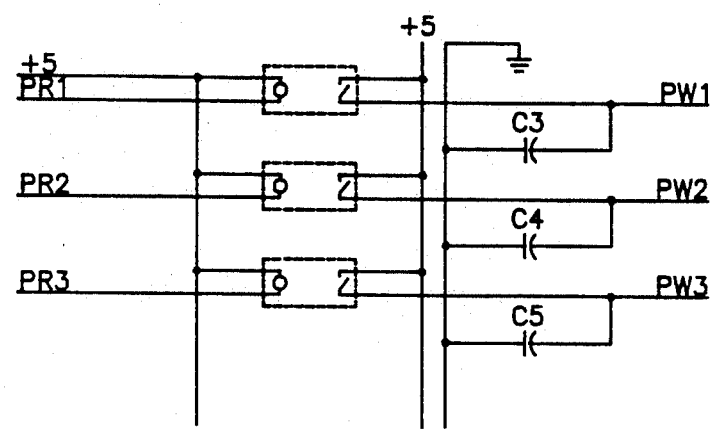

FIG. 11 shows programmable peripheral interface (8255) 80, which controls, among other things, the power enables for the power relays, some of which are shown in FIG. 15, and the direct control means 2 power bus 81. FIG. 11 also shows fifteen hex inverters (74LS04) 82.

Figure 12:
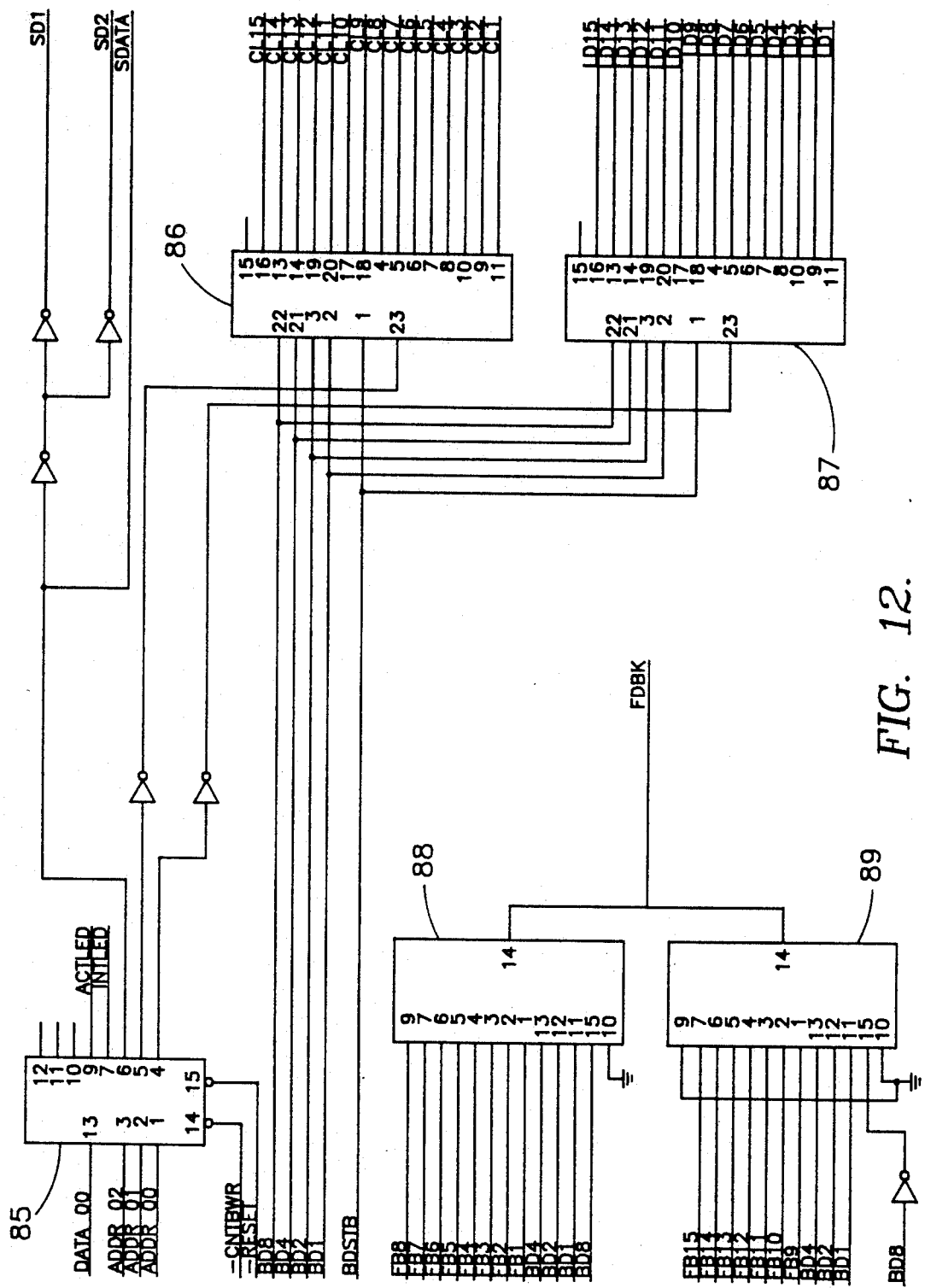

FIG. 12 shows an eight-bit addressable latch (74LS259) 85 through which the information units are serially shifted out through the display line means 3. The eight-bit addressable latch 85 also drives the four-bit latch decoder (4514) 86 and the four-bit latch decoder (4514) 87.

FIG. 12 also shows two eight-channel data selector chips (4512) 88 and 89, which receive the feedback signals from the remote information display means 4 on each display line means 3. These feedback signals are used as part of the system's error detection means.

Figure 13:
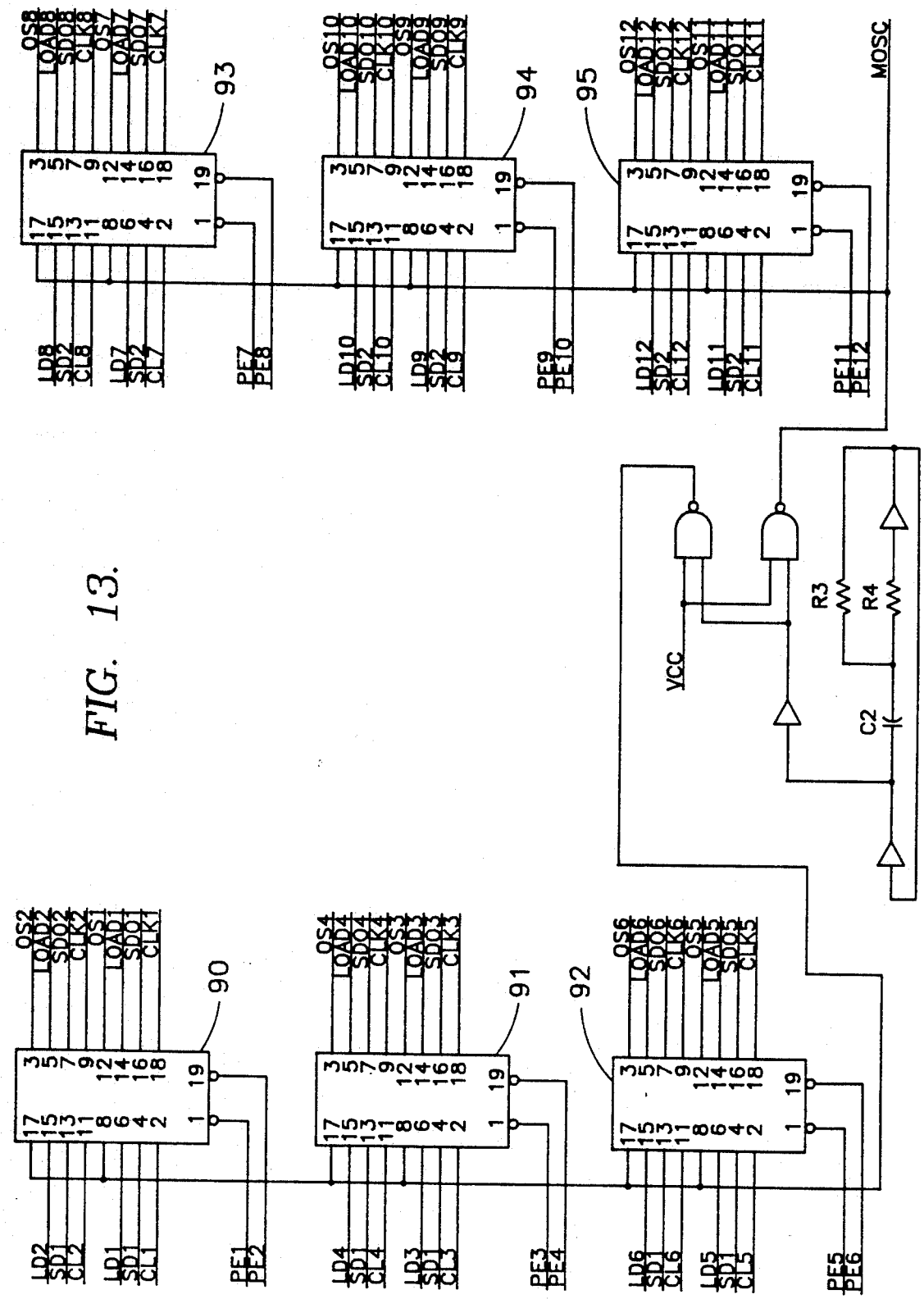
Figure 14:
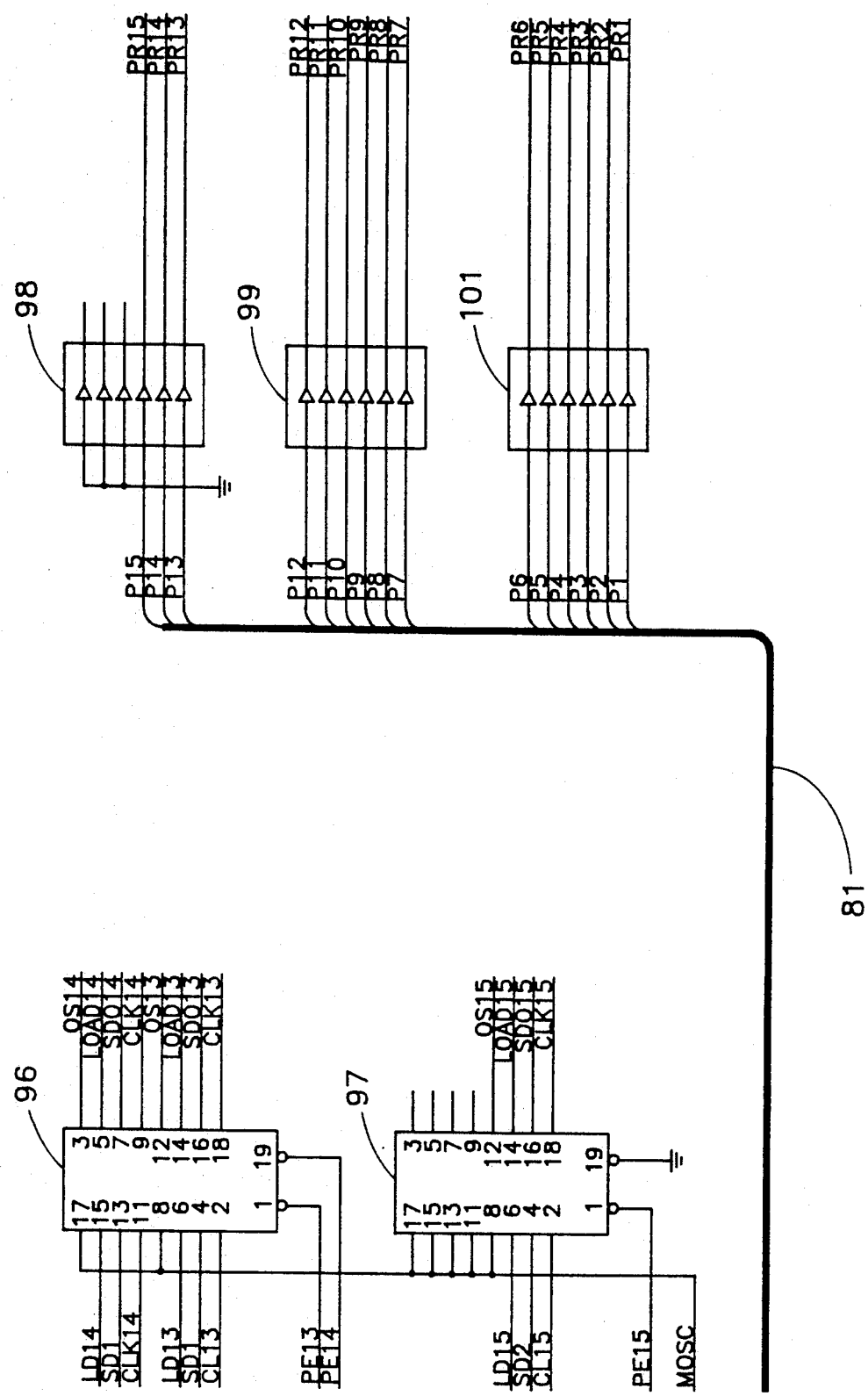

FIG. 13 shows the signal line drivers and the sixty Hertz oscillator for a direct control means 2. FIG. 13 and FIG. 14 show eight Schottky octal three-state drivers (74LS244), which are designated as items 90 through 97. The oscillator is fed to all the driver chips and is common to the entire system.

In FIG. 13, the values believed most advantageous for said application are 100k for resistor R3, 1 Meg for resistor R4 and 0.1UF for capacitor C2, although there may be many alternative values.

FIG. 14 also shows three hex buffer, high-volt open collector output chips (7417), labeled as items 98, 99 and 101.

FIG. 15 shows three of the fifteen power relays for supplying and controlling the power to the display line means 3.

In FIG. 15, the values believed most advantageous for said application are 10UF for capacitors C3, C4 and C5, although there may be many alternative values.

Figure 16:
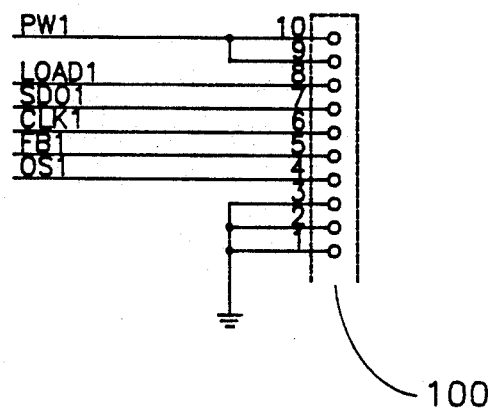

FIG. 16 shows a diagram of one of the sixteen ten-pin connectors (SOC10) 100 which can be used to connect to and communicate with the direct control means 2.

A preferred memory map which may be used for the retail store price display application of the direct control means 2 is set forth in Table V.

TABLE V

| Address | Description |
| --- | --- |
| 0000H-1FFF Hex | System ROM |
| 2000H-5FFF Hex | System RAM |
| 6000H-7FFF Hex | EEPROM Parameter Storage |
| 8000 Hex | UART Control Register |
| 8000 Hex | UART Data Register |
| A000 Hex | Line Select Latch |
| A001 Hex | Power Enables Lines 1-8 |
| A002 Hex | Power Enable 9-12 and Feedback |
| A003 Hex | 8255 Control Port |
| C000 Hex | Line Load Sinal (Uses DATA 00) |
| C001 Hex | Line Strobe Signal (Uses DATA 00) |
| C002 Hex | Line Data Out |
| C003 Hex | Interrupt LED |
| C004 Hex | Direct Control Means LED |

Figure 18:
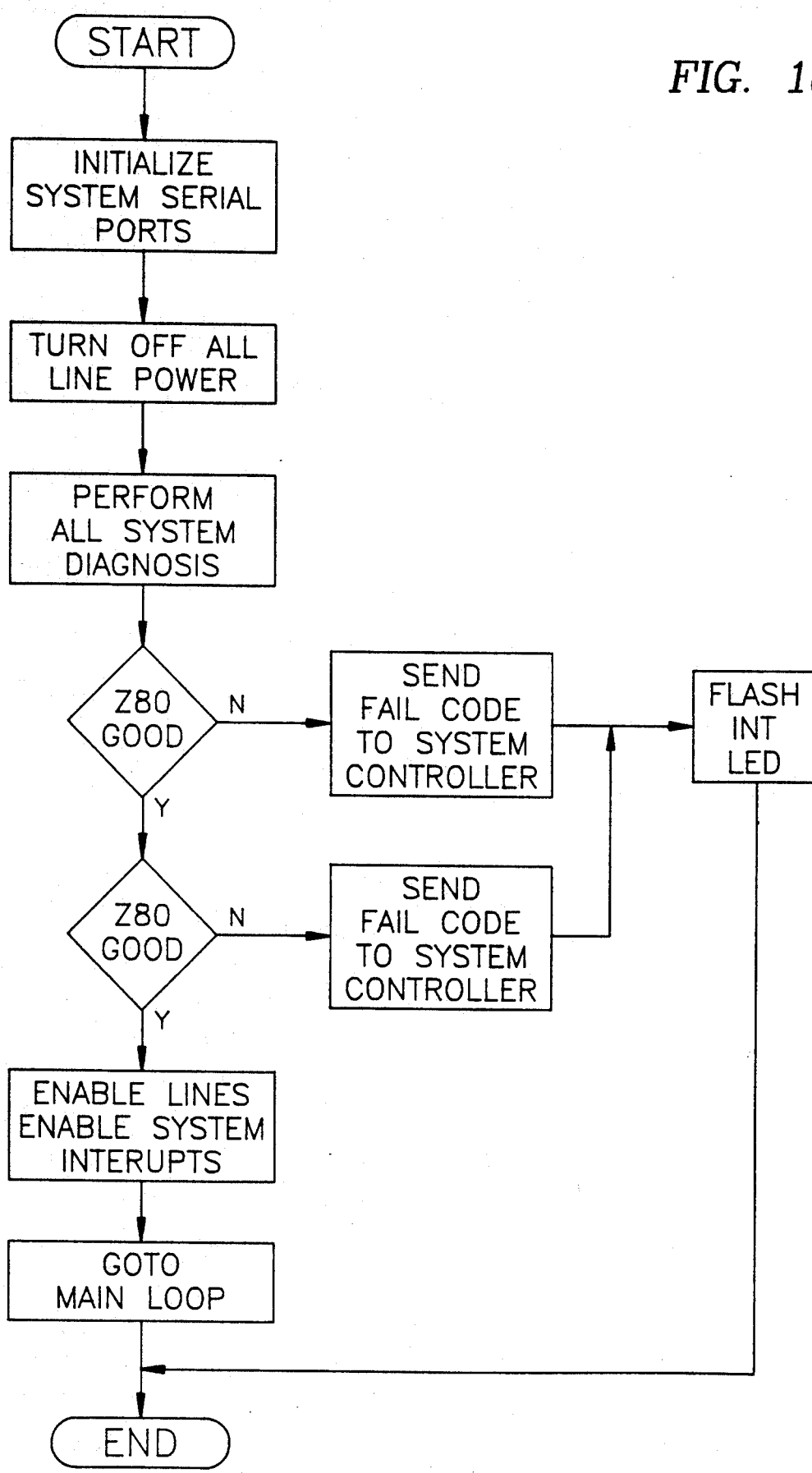
FIG. 18 shows a flow chart for one means to practice the direct control means software power up and startup sequence.

FIG. 18 shows a flow chart for the direct control means 2 power on and diagnostic sequences. In FIG. 18, performing all system diagnosis involves checking to determine if the Z80 CPU 60 register and its inputs and outputs are optional and performing an address check. If the Z80 CPU 60 checks out on the forenamed tests, the following additional tests are then performed: All memory locations ar written to with binary 1's; then with all binary 0's; and then a sequential address check is performed to determine if any address lines are shorted.

Figure 19:
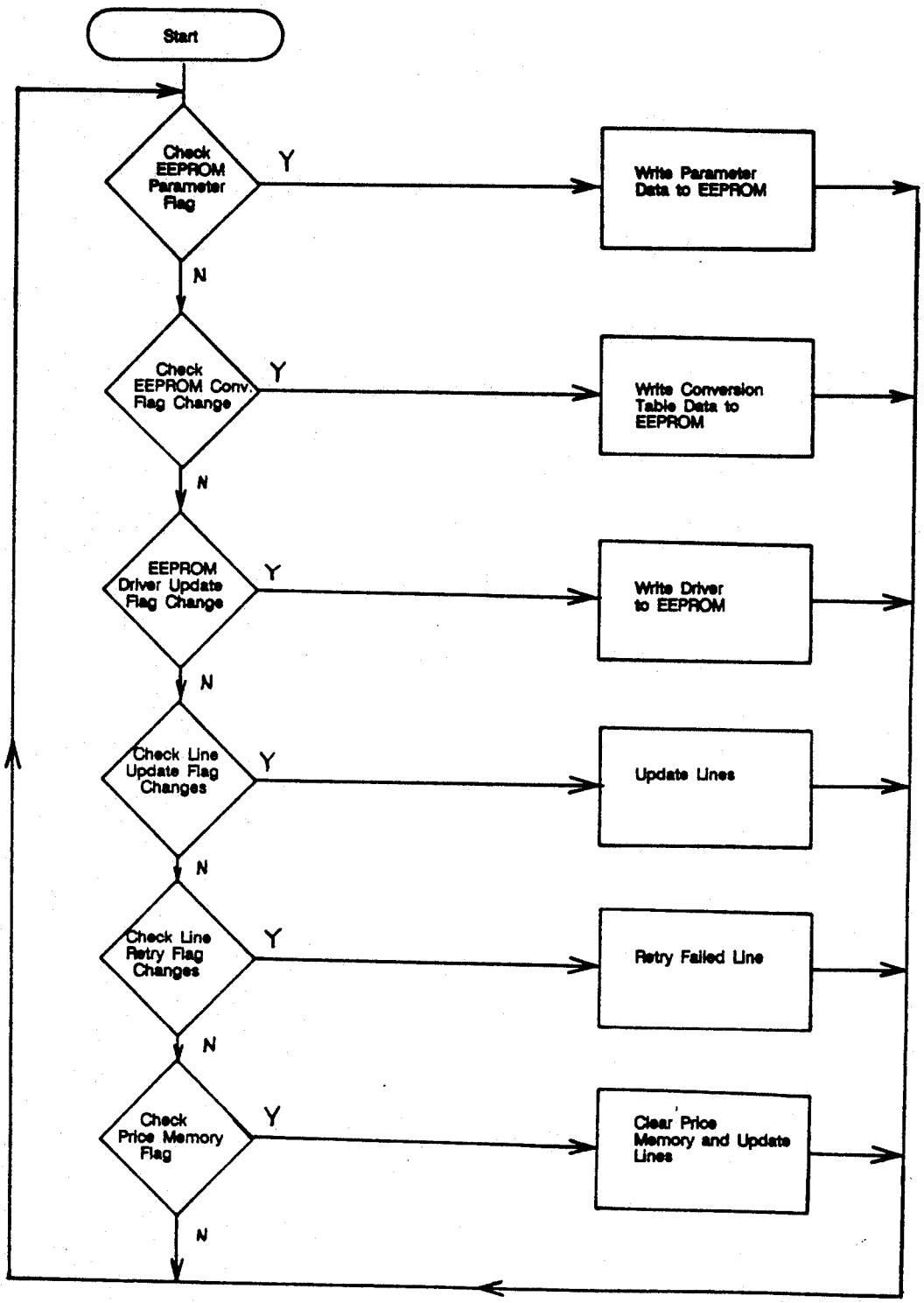
FIG. 19 shows a flow chart for one means to practice the direct control means software main monitoring functions.

If the additional Z80 CPU 60 tests are successful, the display line means 3 are enabled, the display line means 2 interrupts are enabled and the direct control means 2 software goes to its main operational loop, shown in FIG. 19.

FIG. 19 shows a flow chart for the direct control means 2 software main loop functions, which are continually performed during operation. The main loop checks flags which are set or reset by interrupt type routines set forth more fully herein. The direct control means 2 software interrupt routines receive commands to initiate execution of the routines, part of which changes the flags referred to in the main loop flow chart, as set forth more fully herein.

In FIG. 19, the first function is to check the EEPROM 67 parameter flag. The interrupt routine which sets this flag to a binary 1 is initiated by command 09 Hex, which causes the interrupt routine to get the parameter data from the serial port and to place it into the scratchpad buffer. In the preferred retail store price display application, the parameter data is in thirty-six byte format. The parameter update bit would then be set to 1 and the software would return from the interrupt routine.

If the parameter flag has been set to binary 1 by the interrupt routine, the main loop will cause the parameter data to be written from the scratchpad buffer to the EEPROM 67 and the system will then return to the main loop, as shown in FIG. 19.

If the EEPROM parameter flag has not been triggered, the main loop goes to the next function and checks the EEPROM 67 conversion flag to determine if the interrupt loop has set it to binary 1. The interrupt routine which sets this flag to binary 1 is initiated by command OB Hex. The interrupt routine receives sixteen bits from the serial port and transmits them to the scratch pad RAM and then sets the conversion table write bit to binary 1.

If the EEPROM conversion flag has been set to binary 1 by the interrupt routine, the main loop will cause the conversion table to be written from the scratchpad RAM to the EEPROM 67 and the system will then return to the main loop, as shown in FIG. 19.

If the EEPROM conversion flag has not been changed by its interrupt routine, the main loop proceeds to the next function of determining if the EEPROM driver update flag has been changed. The interrupt routine which sets this flag to a binary 1 initiated by command OA Hex. The flow of the interrupt routine involves obtaining the line number byte from the serial port and then retrieving five hundred and twelve bytes from the serial port and storing it in the scratchpad RAM. The routine then sets the driver update flag to binary 1, which is then picked up by the main loop. If the EEPROM driver update flag has been changed to binary 1, then the main loop causes the driver to be written to the EEPROM, as shown in FIG. 19.

If the EEPROM driver update flag has not been changed to binary 1, the main loop proceeds to check for line update flag changes and there is a line update flag for each display line means 3. There are two interrupt routines for the next main loop function of checking the line update flag for a change to binary 1, and they are initiated by command 03 Hex and command 04 Hex. The interrupt routine initiated by command 03 Hex sets all line update flags to binary 1, which is then executed by the main loop. The interrupt routine initiated by command 04 Hex gets the line number byte from the serial port, uses that display line means byte to set that display line means update flag bit to binary 1.

As shown in FIG. 19, when the main loop picks up the binary 1 for one or more line update flags, it causes the information units to be transmitted to the information display means 4, and then returns to the main loop. If none of the line update flags have been changed by the interrupt routines, the main loop proceeds to the next function of determining if the line retry flag has been changed by its interrupt routine to binary 1.

The interrupt routine which changes the line retry flag to binary 1 is initiated by command 08 Hex. If the main loop detects that the line retry flag has been changed to binary 1, it resets the line error flag to binary 0, re-starts the line and then returns to the main loop, as shown in FIG. 19.

As shown in FIG. 19, if the line retry flag has not been changed, the main loop proceeds to the next function of checking the price memory flag to determine if its interrupt routine has changed it to binary 1. The interrupt routine for the price memory flag is initiated by command 08 Hex, and involves resetting the direct control means 2, clearing all memory and display line means 2 and then setting the memory clear flag to binary 1, which is detected by the main loop.

If the main loop detects that the price memory flag has been changed to binary 1, it clears the price memory, updates the display line means and then returns to the main loop. If the main loop does not detect that the price memory flag has been changed, it returns to the main loop, as shown in FIG. 19.

Figure 20:
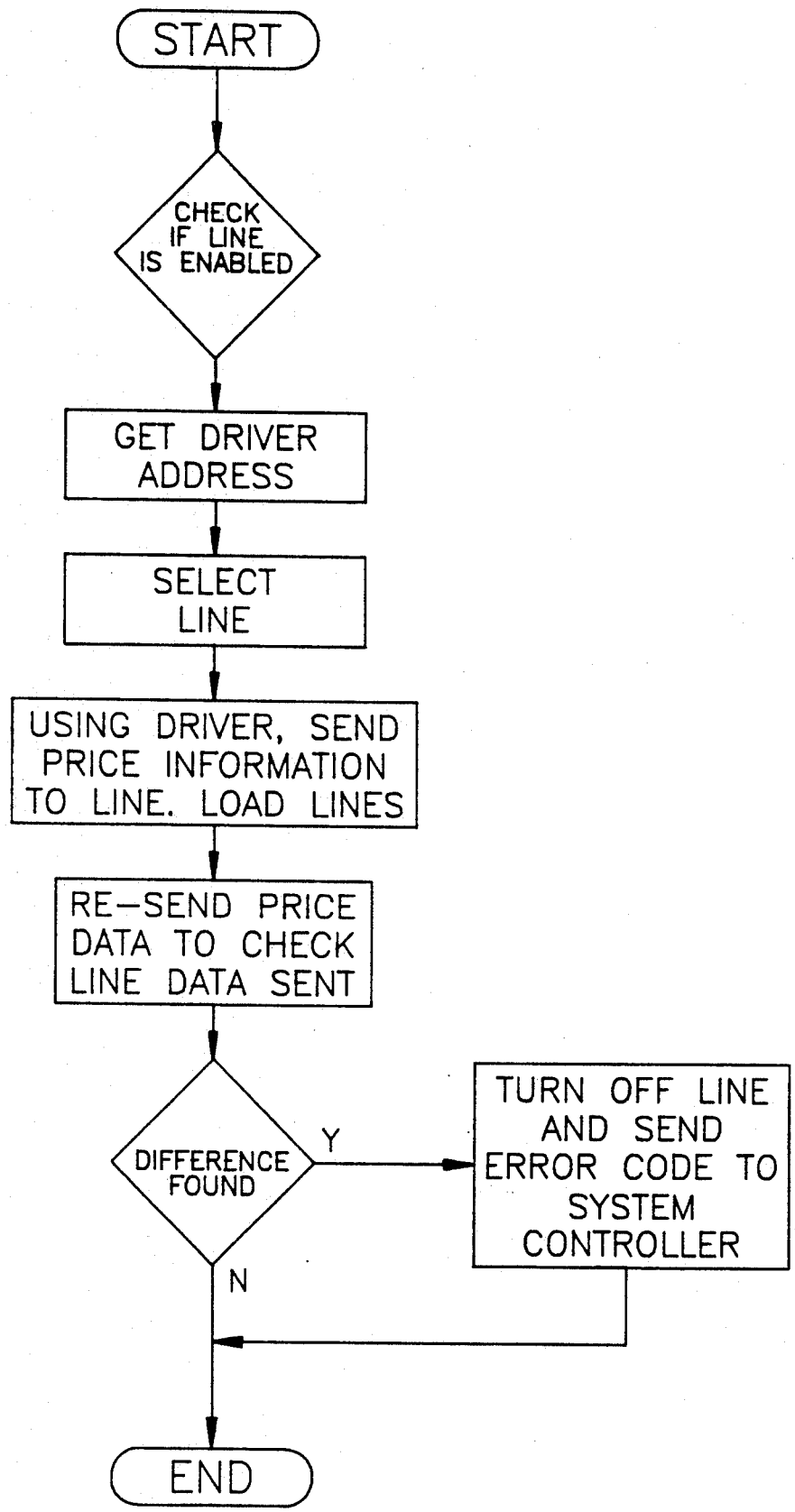
FIG. 20 shows a flow chart for one means to practice the direct control means software line update sequence.

FIG. 20 shows a flow chart for the direct control means 2 software line update sequence, which is initiated in the main loop as shown more fully in FIG. 19. If the display line means to be updated is enabled, the routine obtains the memory address for the driver routine to perform the conversion and/or transmission of information. After choosing the correct display line means the information units are transmitted to the display line means the first time.

The routine then sends the information units a second time as part of its error detection means as described more fully herein. If there is a difference between what was transmitted the first time and what was transmitted the second, the routine disconnects operating power to the display line means 3 and transmits an error code to the system control means 1.

Figure 21:
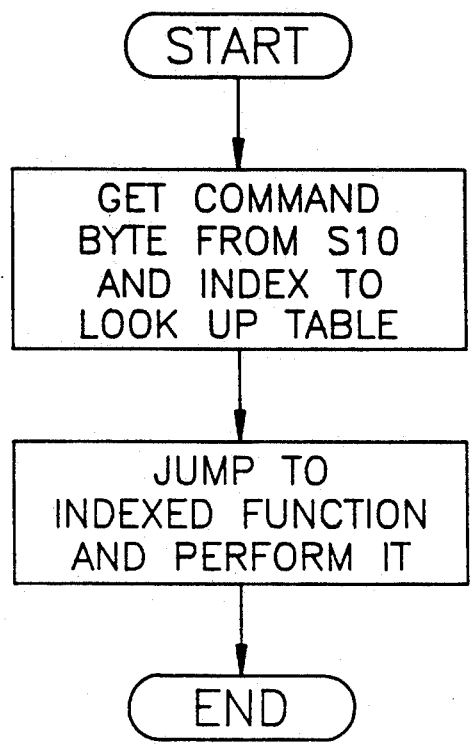
FIG. 21 shows a flow chart for one means to practice the direct control means software interrupt functions.

FIG. 21 shows a very general flow chart for the direct control means 2 interrupt functions. The interrupt routines obtain their command bytes from the ten-pin connectors 100, one of which is shown in FIG. 16, and based upon the indexing to the lookup table, jump to the indexed function and perform it. The end statement merely indicates the end of the particular interrupt routine.

The display line means 3 can be accomplished by numerous means and is the means which facilitates the transmission of the information units and operating power from a direct control means 2 to the information display means 4. The display line means 3 also facilitates the serial transmission of the information units to and between information display means 4 and facilitates the transmission of feedback information from the most remote information display means 4 on a display line means 3 back to the direct control means 2. Each direct control means 2 can control and support numerous display line means 3.

To practice this invention, the display line means 3 can be accomplished in several different ways, including, without limitation, direct wire, fibre optics, infrared signals, etc.

Figure 22:
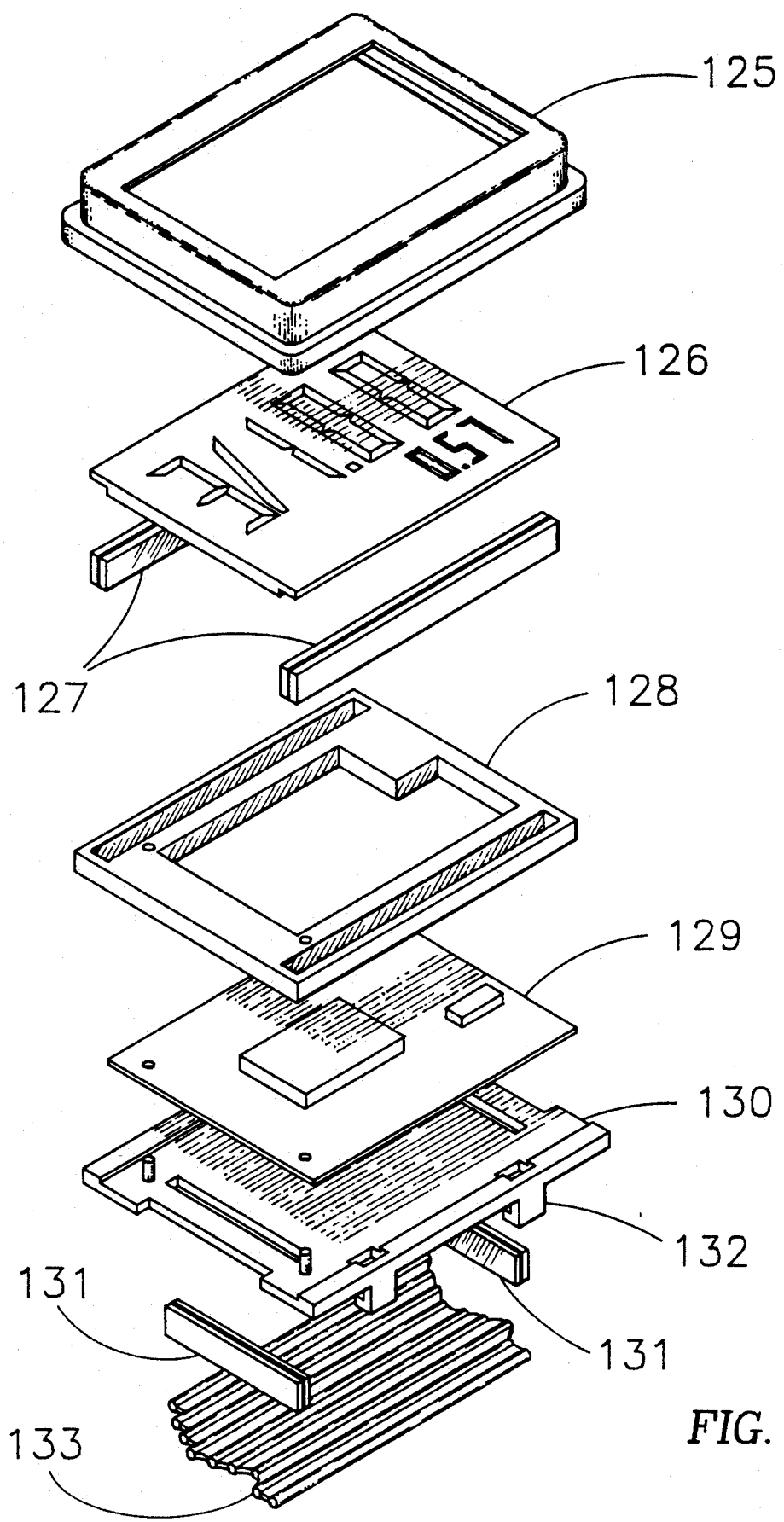
FIG. 22 shows an orthogonal exploded view of one means to practice the information display means of this invention.

One example of a means to practice the display line means 3 is to conductively connect a flat, multi-conductor cable with nine conducting means to the direct control means 2 and to conductively connect each of the information display means 4 thereto. Flat laminated conductor cables such as those manufactured by Parlex Corporation, Methuen, Mass. can be used. The conductor cables are embedded in insulation material parallel to one another. A depiction of such an application is shown in FIG. 22, item 133.

In an application of this invention to retail store price information displays, the display line means 3 has nine conductors, each insulated from one another. The conductors in that application are utilized as shown in FIG. 17, items 107 through 115, and as set forth more fully herein.

The display line means 3 can be conductively connected to each information display means 4 numerous ways. In a retail store price display application of this invention, elastomeric or similar conductive fittings can be positioned between the display line means 3 and a conductive edge means within the information display means 4 such that each conductor is independently and conductively connected to the information display means 4.

To practice this invention, the primary function of each information display means 4 is to receive the computer-based information unit pre-designated for it and to convert information contained therein to a visual image, and numerous means can be employed to accomplish this.

Figure 17:
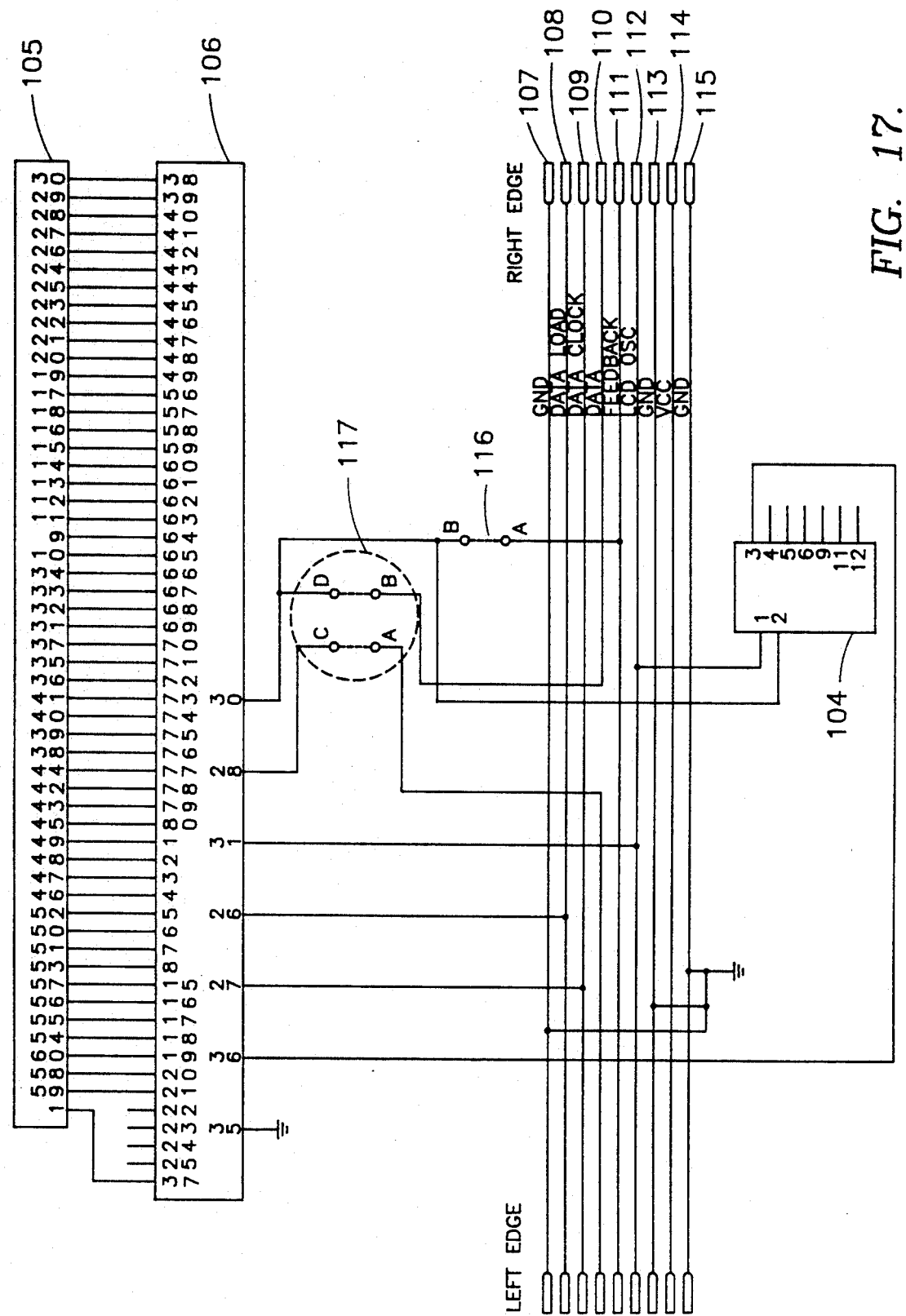
FIG. 17 shows a schematic circuit diagram of one means to practice the information display means contemplated by this invention.

A preferred circuitry means to convert the computer or electronically based information to a visual image is shown in FIG. 17. FIG. 17 shows a Liquid Crystal Display ("LCD") 105 which forms the actual displayed images, and the fifty-six bit display driver chip (M5221GS) 106 that controls and drives the LCD. In the case of this fifty-six bit display driver chip 106, the direct control means 2 converts the computer-based data to fifty-six bit format before transferring it through the display line means 3.

FIG. 17 also shows a binary up-counter (4024) 104 which allows the information displayed to be blinked on and off. Data out from the fifty-six bit display driver chip 106 will cause the binary up-counter 104 to stay in reset mode. As soon as the data out from the fifty-six bit display driver chip 106 changes, the binary up-counter 104 will generate an output which causes the blank pin on the fifty-six bit display driver chip 106 to cause the display to blank out. When the reset line of the binary up-counter 104 is low, the binary up-counter 104 counts up.

The jumper 116 will be connected on the information display means 4 most remote to the direct control means 2, thus transferring information to the feedback line 111. The dual jump RLU 117 can be configured left hand or right hand to allow the direct control means 2 to be configured on and transfer data from either side of the information display means 4. A left hand configuration would connect A to C and B to D, whereas a right hand configuration would connect A to D and B to C.

The lines designated in FIG. 17 as items 107 through 115 correspond to conductive means connected to the display line means 3. Conductive lines 107, 113 and 115 are ground lines, while conductive line 114 facilitates the five volt power supply to the information display means 4.

Conductor line 108 facilitates the instruction from the direct control means 2 to the information display means 4 which causes the fifty-six bit display driver chip 106 to load the information units into the LCD driver latch for conversion to a visual image.

Conductor line 109 facilitates the clocking of the information units into the fifty-six bit display driver chip 106. Conductor line 110 facilitates the actual transfer of the information units to the information display means 4.

Conductor line 111 facilitates the transfer of the feedback information back to the direct control means 2 as part of the system error detection feature. Conductor line 112 facilitates the supply of a sixty hertz signal to the fifty-six bit display driver chip 106 and to the binary up-counter 104.

The information display means 4 can be housed by a number of different known means and can also be conductively connected to the display line means 3 by a number of different means, such as through the use of elastomeric conductive connections.

FIG. 22 shows an example of a retail store price information display application of the information display means 5. The bottom piece 130 of the information display means 4 structure includes a flat plat base with four perpendicular legs or attachments 132 which facilitate the connection of the information display means 4 to the display line means 3 and/or to the store shelves. The bottom portion 130 of the structure also contains two rectangular slots which serve as containment and guides for two elastomeric conductors 131 which provide the conductive link between the circuit board 129 and the display line means 3.

The bottom portion 130 includes three cylindrical plugs which serve as location guides over which the three corresponding holes in the circuit board 129 and the guide component 128 of the display structure are placed. The combination of the cylindrical plugs, the corresponding holes in the circuit board 129 and the guide component 128 of the structure precisely position the circuit board 129 relative to each of the nine conductors on the display line means 3 and relative to the LCD means 105, to allow use of elastomeric conductors 127 between the LCD means and the circuit board 129.

The top component 125 of the price display structure serves to position the LCD means 126 relative to the other components of the information display means 4.

As shown in FIG. 22, the preferred information display means 4 is configured to display not only the price of the goods, but also a quantity for a price such as the three for one dollar, as shown. The preferred information display means 4 for the retail store application of this invention also displays the price per unit, such as price per ounce, in smaller figures in the lower right corner of the information display means 4.

TABLE VI

PAGE,130
TITLE     BASIC INPUT/OUTPUT SYSTEM
SUBTTL    SYSTEM EQUATES

;DSG PRICE SYSTEM BIOS SYSTEM ROM CODE
;WRITTEN BY BRANDT FINE
;COPYRIGHT © 1989 BY BRANDT FINE
;ROM NUMBER 1 VERSION 1.0
;
;SYSTEM EQUATES...
IGNORE EQU    04B0H   ;TRANSMISSION ENABLES

TABLE VI-continued

PAGE,130
TITLE     BASIC INPUT/OUTPUT SYSTEM
SUBTTL    SYSTEM EQUATES

```
ALCODE EQU   04B2H   ;ALARM CODE
ALMAIS EQU   04B1H   ;ALARM AISLE NUMBER
TRANER EQU   04B3H   ;TRANSMISSION ERROR
                     POINTER
;
;
       DOSSEG
       .MODEL LARGE
       .CODE
SUBTTL INTERUPT 2 -- CMUX INTERUPT HANDLER
;
       ORG        0000H
;
; INT2 HANDLES THE IRQ SIR INTERUPT.
;
INT2   PROC       NEAR
       STI
       PUSH       AX
       PUSH       BX
       PUSH       CX
       PUSH       DX
       PUSH       SI
       PUSH       DI
       PUSH       DS
       PUSH       ES
       CALL       SNDMES
       MOV        AX,0D000H
       MOV        DS,AX
       MOV        ES,AS
       MOV        AL,1
       MOV        ES;[IGNORE],AL   ;WRITE
                                    ALARM
       MOV        BX,0
       INC        BX               ;SET UP DART
                                    CONTROL
                                    PORTS
       MOV        DL,0
       MOV        CX,12
INT2A: MOV        AL,1
       MOV        DS:[BX],AL
       MOV        ES:[ALMAIS],AH   ;STORE AISLE
                                    NUMBER
       NOP
       MOV        AL,DS:[BS]       ;GET ERROR BYTE
       AND        AL,60H
       JNZ        PORTERR          ;COMM.
                                    ERROR
       MOV        AL,DS:[BX]       ;GET PORT
                                    STATUS
       AND        AL,1             ;IS THERE A
                                    CHARATER
       JNZ        CHARFOUND        ;GO IF FOUND
       INC        BX
       INC        BX               ;RUMP TO
                                    NEXT PORT
       INC        DL
       LOOPNZ     INT2A
       MOV        AL,0FFH
       MOV        ES:[ALCODE],AL
CLEAN: MOV        AL,20H
       OUT        20H,AL
       POP        ES
       POP        DS
       POP        DI
       POP        SI
       POP        DX
       POP        CX
       POP        BX
       POP        AX
       IRET
;
FORTERR:
       MOV        AL,5
       MOV        ES:[ALCODE],AL
       JMP        CLEAN
;
CHARFOUND:
       DEC        BX   ;GET DATA PORT
       MOV        AH,DS:[BX]    ;GET BYTE
```

TABLE VI-continued

```
PAGE,130
TITLE       BASIC INPUT/OUTPUT SYSTEM
SUBTTL      SYSTEM EQUATES

CMP     AH,1
        JZ      CRFD0
        CMP     AH,0
        JZ      CRFD2
        CMP     AH,2
        JZ      CRFD3
        MOV     ES:[ALCODE],AL
        JMP     CLEAN
CRFD0:  MOV     AL,1
        MOV     ES,[ALCODE],AL
        INC     BX
CRFD1:  MOV     AL,DS:[BX]
        AND     AL,1
        JZ      CRFD1
        DEC     BX
        MOV     AL,,DS:[BX]
        MOV     ES:[TRANER],AL
        JMP     CLEAN
CRFD2:  MOV     AL,0
        MOV     ES:[ALCODE],AL
        JMP     CLEAN
CRDF3:  MOV     AL,2
        MOV     ES:[ALCODE],AL
        JMP     CLEAN
;
SNDMES:
        PUSH    ES
        MOV     AX,0B000H
        MOV     ES,AX
        MOV     BX,0F50H
        MOV     AL,45H
        MOV     ES:[BX],AL
        INC     BX
        INC     BX
        MOV     AL,52H
        MOV     ES:[BX],AL
        INC     BX
        INC     BX
        MOV     AL,52H
        MOV     ES:[BX],AL
        INC     BX
        INC     BX
        MOV     AL,4FH
        MOV     ES:[BX],AL
        INC     BX
        INC     BX
        MOV     AL,52H
        MOV     ES,[BX],AL
        INC     BX
        INC     BX
        MOV     AL,21H
        MOV     ES:[BX],AL
        INC     BX
        INC     BX
        MOV     AL,21H
        MOV     ES:[BX],AL
        INC     BX
        INC     BX
        MOV     AL,21H
        MOV     ES:[BX],A.
        POP     ES
        RET
MCGS:   DB      'ERROR...'
;
INT2    ENDP
;
;
        END
```

TABLE VII

```
TITLE       SPLIT 7 DIGIT LCD DISPLAY DRIVER
SUBTITLE    DRIVER ROUTINE
; 7 DIGIT WITH SLASH DISPLAY DRIVER
; PART# 7030 REVISION 1.0
;COPYRIGHT © 1989
;WRITTEN BY BRANDT J. FINE
```

TABLE VII-continued

```
TITLE       SPLIT 7 DIGIT LCD DISPLAY DRIVER
SUBTITLE    DRIVER ROUTINE
;
;
;SYSTEM EQUATES
SENDDIG:    EQU 1900H   ;SEND DIGIT ROUTINE
                         LOCATION
SENDBIT:    EQU 1940H   ;SEND BIT ROUTINE
                         LOCATION
ALIGN:      EQU 19C0H   ;ALIGN BIT ROUTINE
                         LOCATION
;
;
        ORG     0000H
DRIVER:
        NOP                 ;MUST ALWAYS BE A NOP
        LD      B,0FFH
        LD      A,(HL)
        BIT     4,A
        JR      Z,DRV1
        LD      B,0
DRV1:   LD      A,B
        CALL    SENDBIT     ;SEND FLASHING BIT
        XOR     A
        CALL    SENDBIT
        CALL    SENDBIT
        CALL    SENDBIT
        LD      A,(HL)
        AND     0FH
        CALL    SENDDIG     ;SEND 7TH DIGIT
        LD      A,(HL)
        LD      B,0FFH
        BIT     5,A
        JR      NZ,DRV2
        LD      B,0
DRV2:   LD      A,B
        CALL    SENDBIT     ;SEND SLASH
        INC     HL
        LD      A,(HL)
        CALL    ALIGN
        CALL    SENDDIG     ;SEND 6TH DIGIT
        LD      A,0FFH
        CALL    SENDBIT     ;SEND UPPER DECIMEL
                             POINT
        LD      A,(HL)
        AND     0FH
        CALL    SENDDIG     ;SEND 5TH DIGIT
        INC     HL
        LD      A,(HL)
        LD      B,A
        CALL    ALIGN
        CALL    SENDDIG     ;SEND 4TH DIGIT
        LD      A,B
        AND     0FH
        CALL    SENDDIG     ;SEND 3RD DIGIT
        INC     HL
        LD      B,0
        LD      A,(HL)
        CP      0FFH
        JR      Z,DR1
        LD      B,0FFH
DR1:    LD      A,B
        CALL    SENDBIT     ;SEND LOWER
                             DECIMENL POINT
        LD      A,(HL)
        LD      B,A
        CALL    ALIGN
        CALL    SENDDIG     ;SEND 2ND DIGIT
        LD      A,B
        AND     0FH
        CALL    SENDDIG     ;SEND 1ST DIGIT
        RET
```

While the preferred embodiment for the invention has been described in detail, those familiar with the art to which this invention relates will recognize various alternative designs and embodiments for carrying out the invention as defined by the following claims.

We claim:

1. An information display system which displays information on multiple information display means, comprising:

a system control means which accesses computer-based information, appends each unit of said information to an address code which designates a direct control means and the information display means on which said unit of information is to be displayed, thereby forming an addressed information unit, and transmits each addressed information unit to said direct control means designated by said address code;

one or more direct control means, communicatively connected to said system control means, which receive said addressed information units and order each addressed information unit relative to other addressed information units to be displayed on information display means on one display line means such that at such time when said direct control means serially transmits all of said information units destined for information display means on one display line means, each information unit is received by the information display means designed by the address code appended to said information unit;

one or more display line means connected to said direct control means, which facilitate transmission of operating power from said direct control means to each information display means and which facilitate transmission and receipt of information and electrical signals between said direct control means and said information display means;

one or more information display means communicatively connected to said display line means, which receive information units and, after receiving a signal from said direct control means, convert information from said information units to a visual image; and an error detection means, in which:

said direct control means further comprises a means to transmit the information units to each of said display line means a second time, thereby causing the information units first transmitted to return to said direct control means through a feedback line means, a means to compare the information units first transmitted to the information units secondly transmitted, and a means to transmit an error signal to the system control means after a disparity is detected between the first transmitted information units and the second;

said display line means further comprises said feedback line means to facilitate the transmission of the first transmitted information units back to said direct control means;

the information display means which is most remote from the direct control means on each display line means is connected to said feedback line means to facilitate serial data transmission of said information units back to said direct control means; and said system control means further comprises a means to receive said error signal and to alert a system operator that an error is present.

2. An information display system as recited in claim 1, wherein:

said system control means further comprises a means to identify from which direct control means, from which display line means and from which information display means the error occurred, and to display an identity of the information display means from which the error originated.

3. An information display system as recited in claim 1, wherein said system control means further comprises a means to convert from a data format of the computer-based information it accesses, to a pre-specified data format.

4. An information display system as recited in claim 1, wherein said system control means further comprises a means to convert from a data format of one or more of the addressed information units to a pre-specified data format for transmission to said direct control means.

5. An information display system as recited in claim 1, wherein said system control means further comprises a means to bilaterally communicate with said direct control means.

6. An information display system as recited in claim 1, wherein said system control means further comprises a means to program and re-program said direct control means.

7. An information display system as recited in claim 6, wherein said direct control means includes an electronically erasable, programmable, read only memory chip to facilitate means to program and re-program said direct control means.

8. An information display system as recited in claim 1, wherein said system control means further comprises a means to transmit commands to said direct control means to initiate programmed routines of said direct control means.

9. An information display system as recited in claim 1, in which the information display means further comprises:

a means to receive information units and operating power from said display line means, a means to store said information units received, a means to communicate information from said storage means back to said display line means such that as soon as another information unit is received, the information unit previously received is forced out of said storage means and to the next information display means, and a means to receive a signal from said display line means causing the information display means to convert information from said information unit to a visual image.

10. An information display system as recited in claim 1, wherein:

said system control means further comprises a means to add to one or more information units, one or more means to initiate a special feature of the information display means; and said information display means which further comprise a means to recognize said means to initiate a special feature and a means to accomplish said special feature.

11. An information display system as recited in claim 10, wherein:

said means to initiate a special feature of an information display means comprises adding a control bit to the information units to which the special feature is desired; and said special feature of said information display means is alternately flashing the visual image being displayed on and off.

12. An information display system as recited in claim 1, wherein the computer-based information is accessed from a source external to the system control means and which further comprises a means to transmit the information units to the system control means.

13. An information display system as recited in claim 12, and which further comprises a means to convert the computer-based information units to place the information units into a format which can be utilized by said system control means.

14. An information display system as recited in claim 12, in which:
   each information unit contains uniform product code formatted product identification information; and
   said system control means further comprises a means to utilize said uniform product code formatted product identification information to append a desired address code to each information unit.

15. An information display system as recited in claim 1, wherein said display line means is comprised of multiple parallel conductors connected at one end to said direct control means and with one or more information display means conductively connected to it throughout its length.

16. An information display system as recited in claim 1, wherein said display line means is comprised of fibre optic cable communicatively connected to said direct control means and communicatively connected to one or more information display means.

17. An information display system as recited in claim 1, wherein:
   said information display means comprises a first storage means for receiving and storing an information unit from said direct control means, a second storage means for the information unit which is converted to a visual image and a means to receive a signal from the direct control means which causes transfer of the information unit from said first storage means to said second storage means; and
   said display line means in which further comprises a means to facilitate the transfer of a signal to the information display means to cause the transfer of the information unit from said first storage means to said second storage means.

18. An information display system which displays information on multiple information display means, which comprises:
   a source of computer-based information units to be displayed;
   a means to transmit said information units to a system control means;
   said system control means which comprises a means to receive said information units, a computer, computer software which comprises a means to append an address code to each information unit, thereby forming an addressed information unit, and said computer software which further comprises a means to transmit said addressed information unit to a bilateral interface means;
   said bilateral interface means which receives said addressed information units and transmits them through a communication port means to a direct control means designated by said address code;
   one or more direct control means, each communicatively connected to said system control means, comprised of a communication port means to receive information from said system control means, one or more communication port means to receive and transmit information to information display means, a means to facilitate use and storage of software, a means to store said information units such that at such time when said information units to be visually displayed on one display line means are to be transmitted, each information unit is received by the information display means designated by the address code appended to said information unit, and a means to transmit said information units to said display line means;
   one or more information display means communicatively connected to said display line means, which comprise a means to receive information and operating power from said display line means, a means to store information received, a means to communicate information from said storage means back to said display line means such that as soon as another information unit is received, the information unit previously received is forced out of said storage means back to the display line means and to next information display means, and a means to receive a signal from said display line means to convert information from the information unit stored in said information display means at that time, to a visual image; and
   one or more display line means, each of which is conductively connected to said direct control means by nine independent conductive mans, three of which facilitate a ground means, one of which facilitates a means to transmit operating power to the information display means, one of which facilitates a feedback line means, one of which facilitates a signal means to cause said information display means to create a visual image utilizing information within the information unit, one of which facilitates transmission of an oscillating signal to the information display means, one which facilitates a means to transmit a timing signal from a clock to the information display means and one of which facilitates the transmission and receipt of said information units between the direct control means and the information display means.

19. An information display system as recited in claim 18, which further comprises an error detection means, in which:
   said direct control means further comprises a means to transmit the information units to each of said display line means a second time causing the information units first transmitted to return to said direct control means through a feedback line means, a means to compare the information units first transmitted to the information units secondly transmitted and a means to transmit an error signal to the system control means after a disparity is detected between the first transmitted information units and the second;
   said display line means further comprises said feedback line means to facilitate the transmission of the first transmitted information units back to said direct control means;
   the information display means which is most remote from the direct control means on each display line means is connected to said feedback line means to facilitate serial data transmission of said information units back to said direct control means; and
   said system control means further comprises a means to receive said error signal and to alert a system operator that an error is present.

20. An information display system as recited in claim 18, wherein:

said system control means further comprises a means to identify from which direct control means, from which display line means and from which information display means the error occurred, and to display an identity of the information display means from which the error originated.

21. An information display system which displays information on multiple information display means, as recited in claim 18, and in which the bilateral interface means further comprises a means to convert the addressed information units data format to achieve compatibility with the direct control means to which it is being transmitted.

22. A method for displaying multiple units of computer-based information, each on one of multiple information display means, which comprises the following steps:
   receive information units from a computer-based information source, with each information unit containing at least the information to be displayed on one information display means;
   serially append each of said information unit to an address code which designates the information display means on which the information is to be displayed;
   transmit each addressed information unit to a control means designated by the address code;
   store each information unit in said direct control means in such an order that at such time when it is serially transmitted with other information units to be displayed on one display line means, said information unit will be transmitted from one information display means to another until the information unit reaches the information display means pre-designated by the address code appended to it;
   serially transmit each information unit to the display line means and the information display means designated by the address code appended to it;
   convert the information unit to a visual display; detecting errors in the information units visually displayed by transmitting the information units to the information display means a second time, thereby causing the information units first transmitted to return to said direct control means through a feedback means;
   comparing the information units first transmitted to the information units secondly transmitted; and
   if an error is detected as present, transmitting an error signal to the system control means to alert a system operator that an error is present.

23. A method for displaying multiple units of computer-based information as recited in claim 22, and which further comprises:
   a means to add one or more special feature bits to one or more of said addressed information units before it is transmitted to said intermediate storage and control means; and
   wherein said conversion of the computer-based information to be displayed to a visual image further includes recognizing said one or more special feature bits and incorporating said special feature into the visual display.

24. A method for displaying multiple units of computer-based information as recited in claim 22, wherein said special feature is causing the visual display to be blinked on and off.

* * * * *